United States Patent [19]

Ohshima et al.

[11] Patent Number: 5,642,509
[45] Date of Patent: Jun. 24, 1997

[54] DATA PROCESSING APPARATUS WITH EVENT NOTIFICATION AND PICTURE DRAWING SCHEDULING

[75] Inventors: Masamichi Ohshima, Tokyo; Hiroshi Inoue, Yokohama, both of Japan

[73] Assignee: Canon Kabushiki Kaisha, Tokyo, Japan

[21] Appl. No.: 434,983

[22] Filed: May 4, 1995

Related U.S. Application Data

[63] Continuation of Ser. No. 270,303, Jul. 5, 1994, abandoned, which is a continuation of Ser. No. 916,624, Jul. 22, 1992, abandoned.

[30] Foreign Application Priority Data

Jul. 25, 1991 [JP] Japan ................... 3-207274

[51] Int. Cl.$^6$ ........................................ G06F 3/00
[52] U.S. Cl. .......................... 395/682; 395/335
[58] Field of Search ........................ 395/682, 326, 395/335, 141, 118

[56] References Cited

U.S. PATENT DOCUMENTS

| | | | |
|---|---|---|---|
| 4,367,924 | 1/1983 | Clark et al. | 359/56 |
| 4,655,561 | 4/1987 | Kanbe et al. | 359/56 |
| 5,253,340 | 10/1993 | Inoue | 395/163 |

FOREIGN PATENT DOCUMENTS

| | | | |
|---|---|---|---|
| 0438152 | 7/1991 | European Pat. Off. | 139/151 |
| 2242418 | 9/1990 | Japan | 84/248 |
| 2226432 | 6/1990 | United Kingdom | 104/124 |

*Primary Examiner*—Kevin A. Kriess
*Attorney, Agent, or Firm*—Fitzpatrick, Cella, Harper & Scinto

[57] ABSTRACT

The time taken from the generation of an H/W event made by a mouse or a keyboard to the picture drawing process to be performed in accordance with the event is shorted so as to provide a data processing apparatus which can be easily used by an operator because excellent real time characteristics is realized. The data processing apparatus has a host processor which logically constitutes a multitask device for executing a plurality of processes in a time sharing manner, an event notifying device for notifying generation of a hardware event to a corresponding process of a plurality of the processes, and a scheduling device for scheduling a picture draw request supplied from a plurality of the processes to a graphic device so as to form a single series for each picture draw request, and a graphic device processor for controlling the graphic device in accordance with a picture draw command in a predetermined unit transferred from a single series of the scheduling device so as to draw a picture, wherein the event notifying device monitors a state where the picture draw command in a predetermined unit is executed by the graphic device and notifies the event to a corresponding process after the event notifying device has compressed the event if the state of execution exceeds a predetermined degree.

24 Claims, 16 Drawing Sheets

DATA PROCESSING APPARATUS WITH EVENT NOTIFICATION AND PICTURE DRAWING SCHEDULING

This application is a continuation-in-part of application Ser. No. 08/270,303 filed Jul. 5, 1994, now abandoned, which is a continuation of application Ser. No. 07/916,624, filed Jul. 22, 1992, abandoned.

BACKGROUND OF THE INVENTION

1. Field of the Invention

The present invention relates to a data processing apparatus having a display device, and, more particularly, to a data processing apparatus for a multitask operation-multiwindow for use with a pointing device such as a mouse.

2. Related Background Art

In a multitask operation system such as UNIX or OS/2 ("UNIX" and "OS/2" respectively are trade marks of AT & T Bell Laboratories, U.S.A. and IBM, U.S.A.), tasks are simultaneously but asynchronously processed. For example, a plurality of tasks can be simultaneously processed even if the system is performing the control of the display thereof. Furthermore, a task can be transferred from a host to another host and the task can be executed in a group composed of a plurality of host computers mutually connected to each other via a network. In a multiwindow system, information about each task which is being executed is displayed simultaneously on each window of the screen. Among the multiwindow systems of the aforesaid type, X-window is a typical multiwindow system available at present ("X-window" is a trade mark of Massachusetts Institute of Technology).

Hitherto, a refresh scanning type CRT (Cathode Ray Tube) has been usually used as a display device for a computer terminal. A vector scanning type CRT has been frequently used as a large size precise display relating to the CAD (Computer Aided Design).

In the vector scanning type CRT, an image, which is once displayed, is maintained by the memory function until the next screen refreshment (refreshment of all of the screens) is performed. However, the vector scanning type CRT has not been suitable to serve as a real type man-machine interface display such as a moving cursor display, moving icon display, a pointing device such as a mouse or editor display because of its unsatisfactory operation speed.

On the other hand, the refresh scanning type CRT has no memory function and therefore a refresh cycle must be performed at a predetermined frame frequency, the refresh cycle enabling new screens to be supplied at each frame frequency. The aforesaid frequency is the inverse number of the product of the number of scanning lines per frame and the horizontal scanning time for each line. In order to prevent flicker, it is preferable that the aforesaid frequency be 60 Hz or more.

A non-interlace scanning method is commonly utilized in both of the aforesaid type CRTs, the non-interlace scanning method enabling the data movement display on the screen, for example, the icon movement display to be suitable to be observed and followed by a user.

Both of the aforesaid types of CRTs encounter problems in that the size of the display device becomes enlarged and electricity consumption becomes large in proportion to the required display resolution when the resolution is improved for the purpose of, for example, adequately displaying the multiwindow. What is worse, the cost of the drive circuit cannot be reduced. As described above, the large-size and high resolution CRT gives rise to a variety of problems. Therefore, a flat panel type display has been developed recently.

There are a variety of flat display panels including a type which employs the high multidrive system using super twist nematic liquid crystal (STN), and a type which is the modification of the aforesaid type and which has a white/black display, and another type which has a plasma display. All of a variety of the aforesaid flat display panels employ a CRT system image data transferring system and a non-interlace scanning system in which the screen refreshment is performed at a frequency of 60 Hz or higher. Therefore, an unsatisfactory number of 400 to 480 scanning lines can be poorly obtained for one full screen. For example, a large flat display panel having 1000 or more scanning lines has not been put into practical use. The reason for this lies in that satisfactory contrast cannot be obtained in the aforesaid large size flat display panel because the scanning time for one line becomes 10 to 50 µsec or shorter due to performing the refresh cycle which must be carried out at a frame frequency of 60 Hz or more for the purpose of preventing flicker.

In the CRT, an image formed on the fluorescent screen is maintained for a certain time due to the fluorescent characteristics. In the TN type LCD (Twist Nematic type Liquid Crystal Device), an image is formed by utilizing change in the light permeability taken place due to an application of sufficient drive voltage. Both of the aforesaid types must use a high frame frequency which is higher than 30 Hz.

The horizontal scanning time of a CRT display or a TN type LCD having 1920 scanning lines, and 2560 pixels for a line, that is, 4,915,200 pixels for one frame becomes about 17.5 µsec, while the horizontal dot clock frequency becomes about 147 MHz. In the case of the CRT, the horizontal dot clock frequency of 147 MHz is considerably higher than the maximum electron beam modulation frequency of a beam gun for use in a picture tube available at present. As a result, accurate image forming cannot be performed. In a case of the TN type LCD, the fact that 1920 scanning lines are driven comes under a duty factor of 1/1920 which is considerably lower than the minimum duty factor of about 1/400 at present. On the other hand, if driving at an actual horizontal scanning speed is used, its frame frequency becomes lower than 30 Hz and therefore flicker makes the display quality worse. Because of the aforesaid facts, the CRT and the TN type LCD present limits present in enlarging the size of the screen and making the screen precision finer due to the unsatisfactory number of the scanning lines.

Recently, Clerk and Lagerwall have disclosed a ferroelectric liquid crystal device (FLCD) having both high speed responsibility and memory characteristics (bistability) (U.S. Pat. No. 4,367,924). The FLCD has smectic C-phase (SmC*) or H-phase (SmH*) at the characteristic temperature thereof and becomes optically bistable state. Furthermore, the state of the FLCD is changed at high speed in accordance with the applied electric field. Therefore, there is a desire to widely use the FLCD as a display device having high speed memory characteristics.

There is a probability, by using the FLCD, of realizing a large and fine display device which is far superior to the above-mentioned flat panel display device. Since the FLCD must be driven at a relatively low frame frequency, its memory function is utilized so as to realize a partial rewriting scanning function for the purpose of making it an adequate man-machine interface display. The term "partial rewriting scanning function" used hereinbefore means a function that only a region on a screen to be rewritten is scanned and a new picture drawn in the aforesaid region. The partial rewriting scanning has been disclosed in U.S. Pat. No. 4,655,561. As a display using the bistable function of the FLCD, a flat panel (1920 scanning lines)×(2560 pixels for a line) has been realized.

In the FLCD line scanning method, the frame refresh frequency is lowered in inverse proportion to the number of the scanning line. For example, the frame frequency of an FLCD the speed of which is 50 μsec/line can be expressed by the following equation:

$$1920 \ (lines) \times 50 \ (\mu sec/line) = 96 \ (msec) = 10 \ (Hz)$$

On the other hand, the movement of the pointing device, the real time responsibility of the data input by using the keyboard and smoothness of the same are important factors for the operationality of the computer. Although the pointing device index (for example, the mouse font) and the characters have relatively small size as compared with the size of the frame on the screen, high speed responsibility is required when they are displayed. For example, the mouse font and the characters must be usually treated at 60 Hz and 30 Hz, respectively. Therefore, the frame frequency of 10 Hz is insufficient to perform the aforesaid operations.

The aforesaid "partial rewriting scanning technology" is a technology in which a new picture is drawn to rewrite a former picture in a required region in the display, the "partial rewriting scanning technology" being effective to significantly shorten the time required to update the picture to be drawn. If the mouse font is formed with 32×32 bit data, the data display speed becomes as follows:

$$32 \ (lines) \times 50 \ (\mu sec/line) = 1.6 \ (msec) = 625 \ (Hz)$$

When the "partial rewriting scanning technology" is actually used, a "partial rewriting command" must be recognized and the number of scanning lines to be rewritten must be indicated on the display. Because of other factors, the actual frequency at the time of the partial rewriting operation is about 300 Hz. If the partial rewriting operation is performed at about the aforesaid frequency, a significantly improved effect can be obtained in displaying the mouse font or the like on a large size display in a real time manner.

Then, a consideration will be made about a case in which a window system such as the X window is, in the UNIX environment, operated on the display which is arranged to use the aforesaid partial rewriting scanning technology. In the window system, the X-server detects an input made by a user through a pointing device such as a mouse (hereinafter the pointing device is represented by the "mouse") or a keyboard and the X server notifies it to an adequate client process in accordance with the X protocol. At this time, the conventional X server, as frequently as possible, examines the presence of the hardware event to quickly notify the result to the client process in such a manner that the aforesaid operation is periodically performed by a predetermined number of steps in the loop in the server. The aforesaid method is established depending upon an idea that the server must precisely notify the client the event and the treatment of it must be charged by the client, the method being utilized from an ordinary method employed in a conventional X server for the CRT display.

However, the conventional hardware event detection and notifying method encounters a problem in the response of the mouse operation with a graphic user interface using the mouse.

For example, FIG. 11 illustrates a case where a certain graphic object is being moved in response to mouse dragging. At this time, a so-called "direct operational" user interface is employed so as to always update the display of the object to a new position in accordance with the movement of the mouse.

FIG. 8 schematically illustrates the time sequential flow of the process from a moment at which a hardware (mouse) event takes place to a moment at which a picture is drawn on the display. Referring to FIG. 8, a generated mouse event is immediately stored in a hardware (H/W) event queue, and the mouse event is notified to a corresponding client process. The client process which has received the mouse event analyzes the H/W event so as to generate a picture draw request. The server of the window system, which has received it, processes the picture draw request issued from the client process, and then the server issues some picture draw commands to a remote processor (the graphic device processor). On the other hand, the remote processor processes the picture draw commands issued from the server to actually draw a picture on the display (draw a picture on a frame buffer).

However, if a time delay takes place at a step in a process from the generation of the event to drawing of a picture on the display, the time delay between the generation of the even and drawing the picture on the display is lengthened. For example, the time taken to process the final picture draw command cannot catch up with the command issue speed mainly due to the characteristics of the hardware. Furthermore, the CPU allocation time given to the aforesaid process can be shortened for some reason in the environment of the multitask. As a result, as shown in FIG. 8, a considerably long time difference takes place between the generation of the hardware event to the picture draw process performed by the graphic device processor. Consequently, the system of this type becomes a system, the real time characteristics of which are unsatisfactory, and which cannot be used easily for the operator of the mouse.

The aforesaid time delay must be improved by raising the hardware operation speed of the graphic device and by a software means such as the aforesaid partial rewriting scanning technology. The so-called "direct operational" user interface is expected to be widely used with recent rise of the importance of the recent graphic user interface. Therefore, it is very important to overcome the aforesaid problems.

In the operation of a computer, an input from the mouse or the keyboard is called a "hardware (H/W) event" which must be processed for the computer system in a real time manner as much as possible. The reason for this lies in that the H/W event directly relates to the operation performed by the operator and therefore the real time characteristics of the H/W event determines the operationality.

SUMMARY OF THE INVENTION

Accordingly, an object of the present invention is to provide a data processing apparatus capable of overcoming the aforesaid problems experienced with the conventional technology and shortening the time taken from the generation of an H/W event made by a mouse or a keyboard to the picture drawing process to be performed in accordance with the event so as to be easily used by an operator because excellent real time characteristics are realized.

In order to overcome the aforesaid problems, a data processing apparatus according to the present invention comprises: a host processor which logically constitutes multitask means for executing a plurality of processes in a time sharing manner, event notifying means for notifying generation of a hardware event to a corresponding process of a plurality of the processes, and scheduling means for scheduling a picture draw request supplied from a plurality of the processes to a graphic device so as to form a single series for each picture draw request; and a graphic device processor for controlling the graphic device in accordance with a picture draw command in a predetermined unit transferred from a single series of the scheduling means so as to draw a picture, wherein the event notifying means monitors a state where the picture draw command in a predetermined unit is executed by the graphic device and notifies the event to a corresponding process after the event notifying means has compressed the event if the state of execution exceeds a predetermined degree. As a result, the state where the picture draw command formed into a predetermined unit and performed by the graphic device is monitored and, if the state of the execution exceeds a predetermined degree, the event is compressed before it is notified to the process. Therefore, the time taken to draw a picture can be shortened.

Other and further objects, features and advantages of the invention will be appear more fully from the following description.

DESCRIPTION OF THE PREFERRED EMBODIMENTS

A preferred embodiment of the present invention will now be described with reference to the drawings. This embodiment to be described hereinafter is adapted to a computer system having an FLCD as the display.

Structure of Hardware

Figure 1:
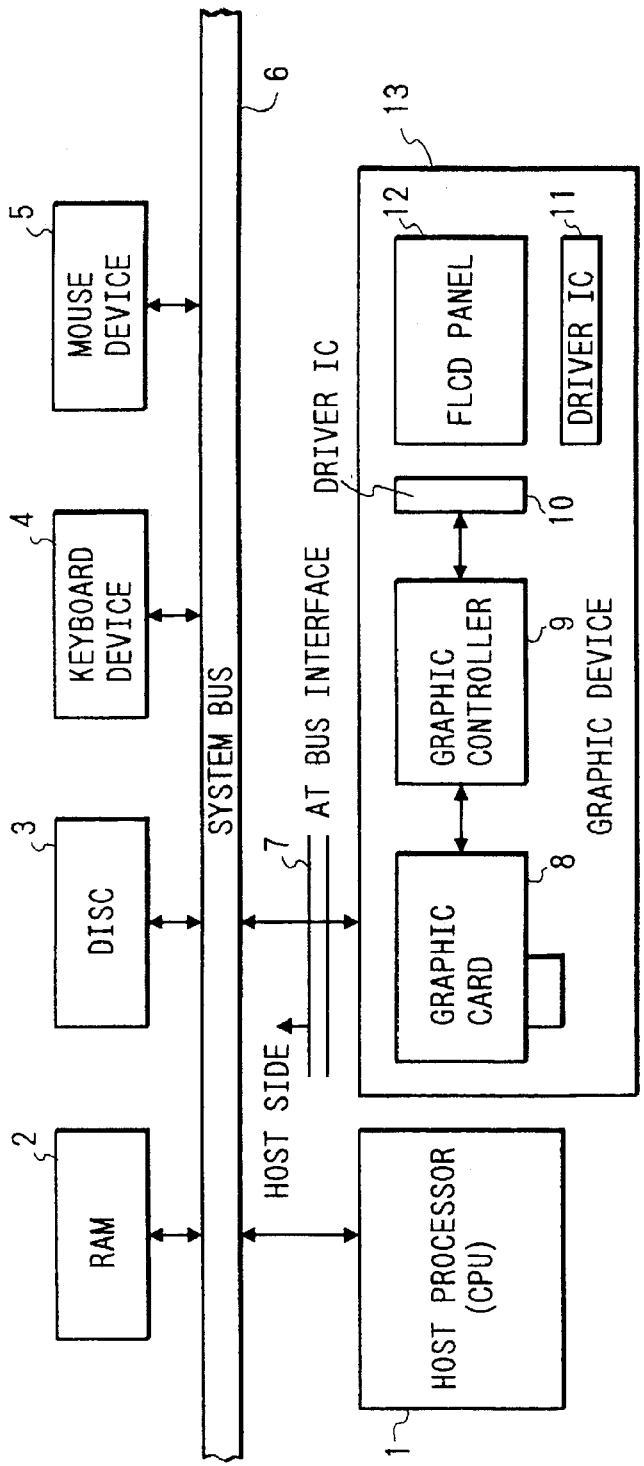
FIG. 1 is a block diagram which illustrates the structure of the hardware of an embodiment of a data processing apparatus according to the present invention.

FIG. 1 schematically illustrates the structure of hardware of an embodiment of a data processing apparatus according to the present invention. The system is composed of a portion controlled by a host side processor (CPU) 1 and a portion controlled by a graphic processor, the host side and a graphic device 13 being arranged to act independently. The term graphic device 13 used hereinbefore is meant an overall device including a graphic card 8 (on which a graphic processor, and a VRAM and the like are mounted), a graphic controller 9 and an FLCD panel 12.

An Operating System (OS) is mounted on the host, that is the body of the computer so as to cause the process to proceed in a time sharing manner. A picture draw command created by the process is transferred to the graphic card 8 in the graphic device 13 via an AT bus interface 7. The graphic card 8 has a function of developing the contents to be drawn in a video RAM (VRAM) in accordance with the picture draw command and a control function of specifically partially rewriting data of the FLCD panel 12 in accordance with the contents to be drawn. The graphic card 8 transmits the contents of the VRAM to the ensuing graphic controller 9 as a digital signal. The graphic controller 9 generates a drive signal from the digital signal denoting the contents of information in the VRAM having the partial rewriting information, the drive signal being used to display a figure or the like at a predetermined address position on the FLCD panel 12 via drivers IC10 and 11.

Figure 2:
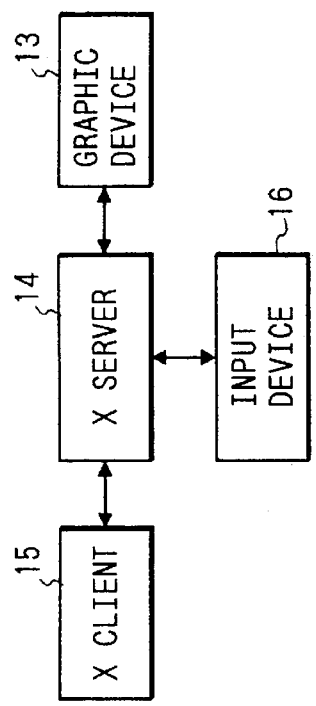
FIG. 2 is a block diagram which illustrates a logical structure to be mounted on the hardware shown in FIG. 1.

FIG. 2 illustrates the structure of logic modules mounted on the hardware shown in FIG. 1. Referring to FIG. 2, an X server 14 and an X client 15 are modules logically formed by software on the CPU 1, a RAM 2 and a disk 3. An input device 16 is illustrated here to collectively represent a keyboard device 4 and a mouse device 5. The aforesaid elements are used to realize a multiwindow environment by the X window system on the FLCD panel 12 shown in FIG. 1 while detecting the input made through the input device 16 made by a user.

Figure 3:
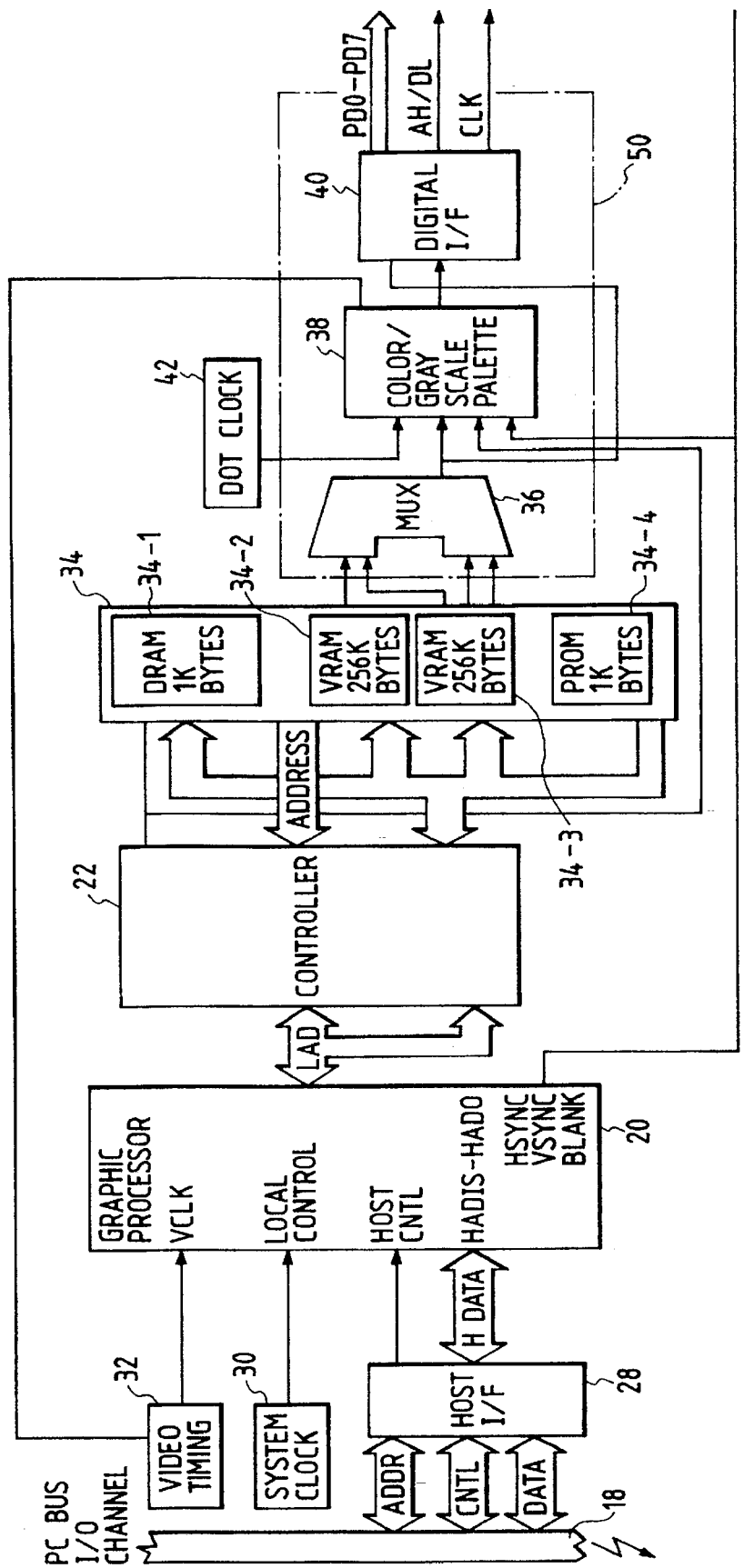
FIG. 3 is a block diagram which illustrates the detailed structure of a graphic card shown in FIG. 1.

FIG. 3 is a block diagram which illustrates the graphic card 8. The graphic card 8 comprises a graphic processor 20, an interface 28 and a memory controller 22 for a memory 34. The memory 34 comprises a RAM 34-1 for storing commands, VRAMs 34-2 and 34-3 for storing video outputs and a ROM 34-4 for storing initial control commands for the graphic processor 20. A graphic command queue for the graphic device 13 to be described later is logically constituted in the RAM 34-1. Some of the aforesaid memories can be constituted on the main memory of the host side portion.

Data communication is performed between the processor 20 and the memory 34 via the memory controller 22. A video timing unit 32 supplies a synchronizing signal to the graphic processor 20, and a clock 30 is supplied as the timing signal for the graphic processor 20. The outputs from the VRAMs 34-1 and 34-2 are supplied to an output interface 50 as the inputs.

The data supplied to the output interface 50 is given an adequate gray scale or a color signal level via a multiplexer 36, the data being then supplied to a digital interface 40 via a color/gray scale pallet 38. The digital interface 40 creates signal AH/DL for distinguishing address data from image data (signal lines PD0 to PD7) on the screen and distinguishing address data from image data and as well as creates timing signal CLK, the signal AH/DL and the timing signal CLK being then supplied to the ensuing graphic controller 9.

The graphic processor 20 comprises, for example, TMS34010 manufactured by Texas Instrument and capable of executing both a graphic command and a general command. The interface 28 comprises "AT bus" manufactured by IBM, the "AT bus" being well known in the personal computer industrial field. The detailed structure of TMS34010 is disclosed in user's guide (publication No. SPVU007) for TMS34010 published by Texas Instrument.

Figure 4:
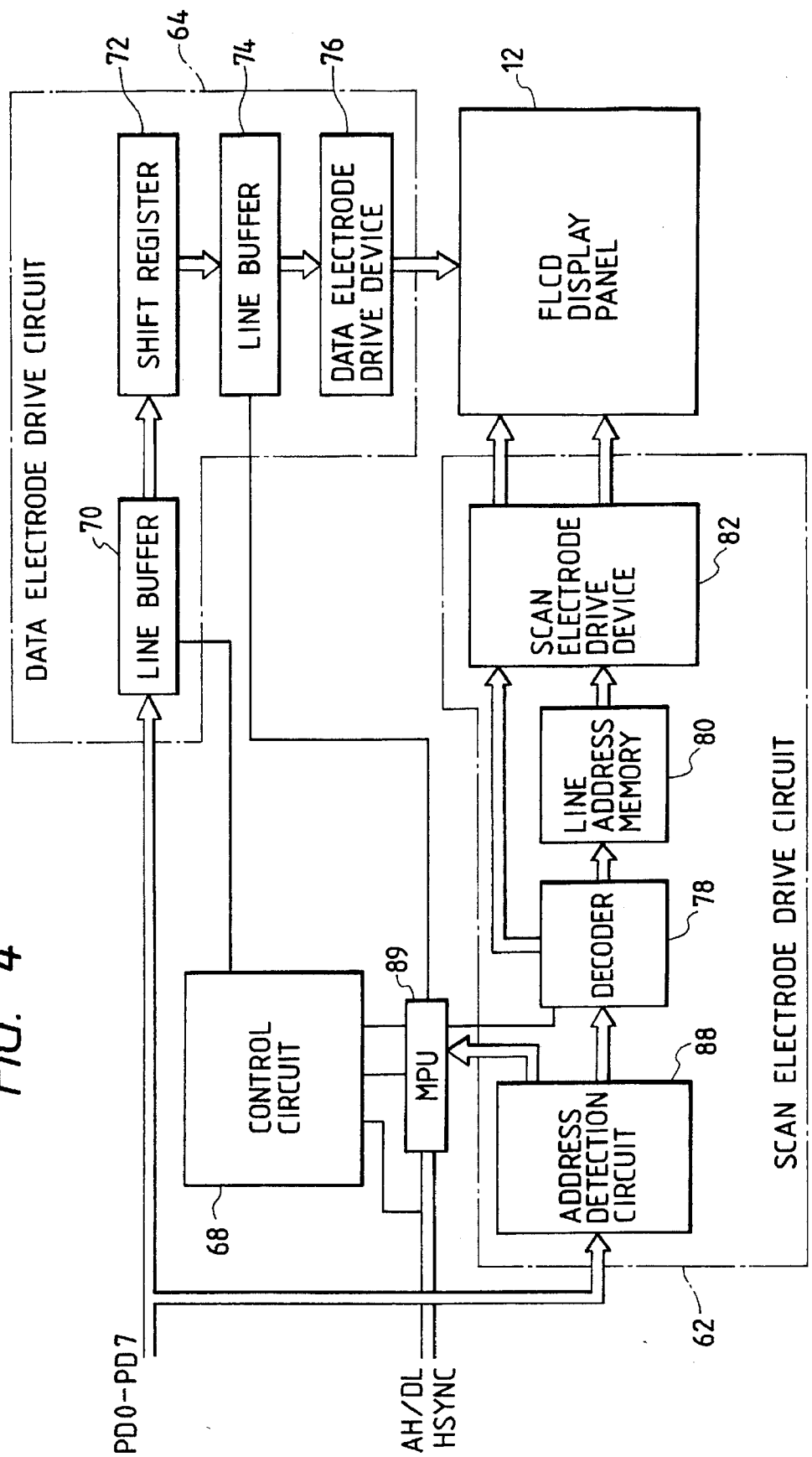
FIG. 4 is a block diagram which illustrates the detailed structure of the graphic controller shown in FIG. 1.

FIG. 4 is a block diagram which illustrates the graphic controller which is supplied with picture draw data from the graphic card 8 so as to drive the FLCD panel 12. The FLCD panel 12 is formed into a matrix structure composed of 1920 scanning electrodes and 2560 data electrodes. The scanning electrodes are connected to a scanning electrode drive circuit 62, while the data electrodes are connected to a data electrode drive circuit 64. The scanning electrode drive circuit 62 includes a decoder 78, a line address memory 80 and an address detection circuit 88. The data electrode drive circuit 64 includes a shift register 72, a line buffer (memory) 74 and a buffer 70.

Since scanning electrode address data (A0, A1, A2, . . . , A15) for addressing the picture draw position on the panel screen and image data (D0, D1, D2, . . . , D2559) are transmitted via the same signal lines PD0 to PD7, the signal AH/DL for discriminating the transmitted data is address data or image data is simultaneously transmitted to a processor 89. If the level of the AH/DL signal is high, a control circuit 68 causes the signals on the PD0 to PD7 to be, as the scanning electrode address data, received by an address detection circuit 88. If the same is low, the control circuit 68 causes the signals to be, as the image data, received by a line buffer 70. The AH/DL signal is as well a transference start signal for transferring data.

The image data received by the line buffer 70 is temporarily stored before it is supplied to a data electrode drive device 76 via the shift register 72 and the line buffer 74 in the horizontal scanning period. The address data detected by the address detection circuit 88 is, by a decoder 78, made to be a drive signal for driving the scanning electrode in accordance with the address data, the drive signal being then applied to a scanning electrode drive device 82 via the line address memory 80.

According to this embodiment, no synchronization is made between the drive of the display panel 12 and the generations of the scanning electrode address data A0 to A15 and image data D0 to D2559 by the processor in the graphic card 8. Therefore, the control circuit 68 and the graphic processor must be synchronized with each other at the time of transferring data. In order to achieve this object, synchronizing signal Hsync is generated in the control circuit at each horizontal scanning operation, the synchronizing signal Hsync being related to the AH/DL signal. The graphic processor 20 monitors the Hsync signal and starts preparation for the ensuing data transmission after it has detected the transition of the level of the synchronizing signal Hsync from the high level to the low level. Then, it raises the level of the AH/DL signal from the low level to the high level to transfer the scanning electrode address data. Then, it lowers the level of the AH/DL signal from the high level to the low level to transfer the image data.

Figure 5:
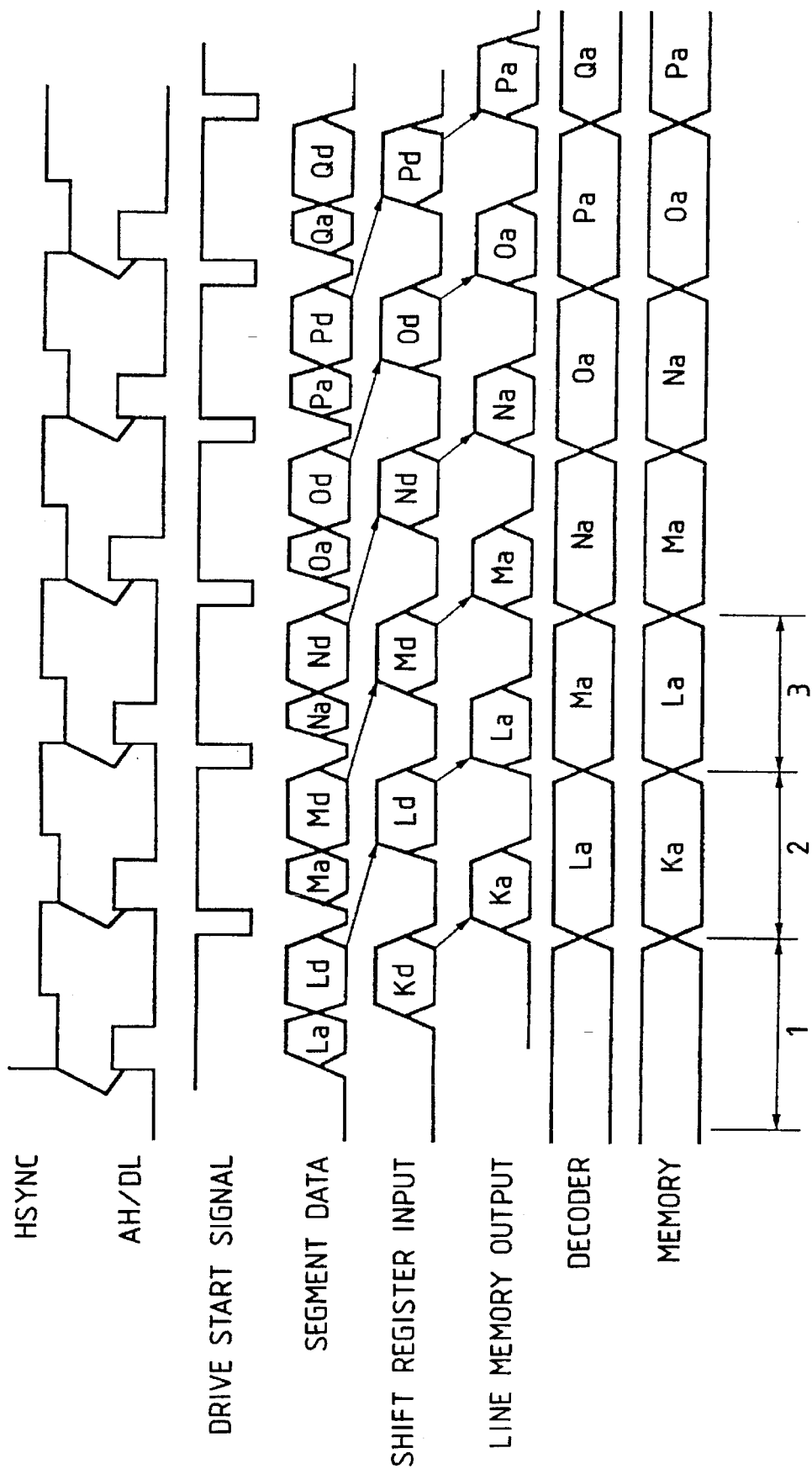
FIG. 5 illustrates waveforms of signals for use in the graphic card shown in FIG. 3.

FIG. 5 illustrates the detailed waveforms of the aforesaid signals.

This embodiment is arranged for the purpose of improving the real time characteristics in the H/W event process to be performed by the graphic device 13 shown in FIG. 1. This embodiment is characterized by the logical structure of the interface with the graphic device 13 on the host side.

(Logical) Structure of Software

The logical structure according to the present invention employs the X window system (X Window System is the trade mark of Massachusetts Institute of Technology) which is operated in the environment of UNIX ("UNIX" is the trade name of AT & T) operation system (OS), the X Window System being mounted on the hardware shown in FIG. 1. It can be said that both UNIX and X window system have attained the standard positions in each region.

UNIX is system software which is characterized by a multitask and multiuser and which provides functions of process control, file system control, hardware input/output, and interprocess communication and the like by a core portion called "kernel". In actuality, the hardware input/output is directly controlled by a module called a "device driver". The device driver causes UNIX to provide a common logical interface to each application software so as to maintain the transplanting probability of the application software. Also the display is provided with a module called a "display driver". However, the device driver is linked to the kernel so as to be one image, but it depends upon each hardware and therefore it is not a specific portion of UNIX.

Figure 6:
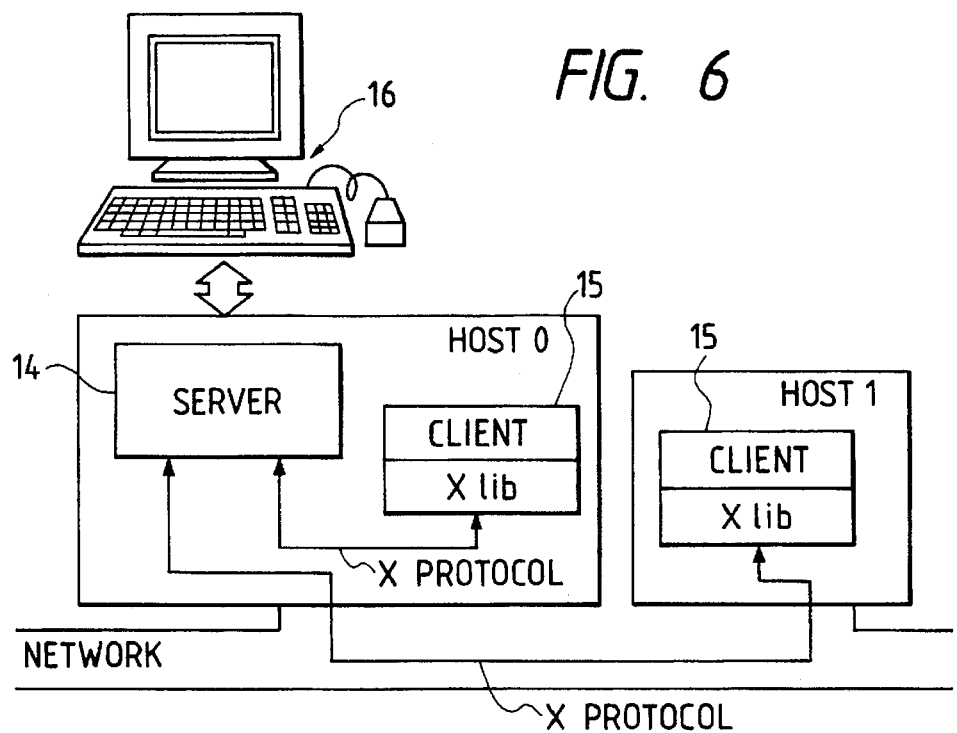
FIG. 6 illustrates the structure of an X window system which is the environment in which this embodiment is operated.

As is well known, X window system is software for realizing the multiwindow environment on a bit map display. The concept of the operation of the X window system is shown in FIG. 6. The overall structure of the X window system is composed of one X-server (hereinafter simply called a "server") 14, and a plurality of X clients (hereinafter simply called "clients") 15 (only one X client is illustrated and the other X clients are omitted in FIG. 2). The server 14 receives a user's input (hardware event) from the input device 16 such as the keyboard device (hereinafter abbreviated to a "keyboard") or the mouse device (hereinafter abbreviated to a "mouse"), performs communication with the client 15, and issues a picture draw command to the graphic device 13.

Figure 7:
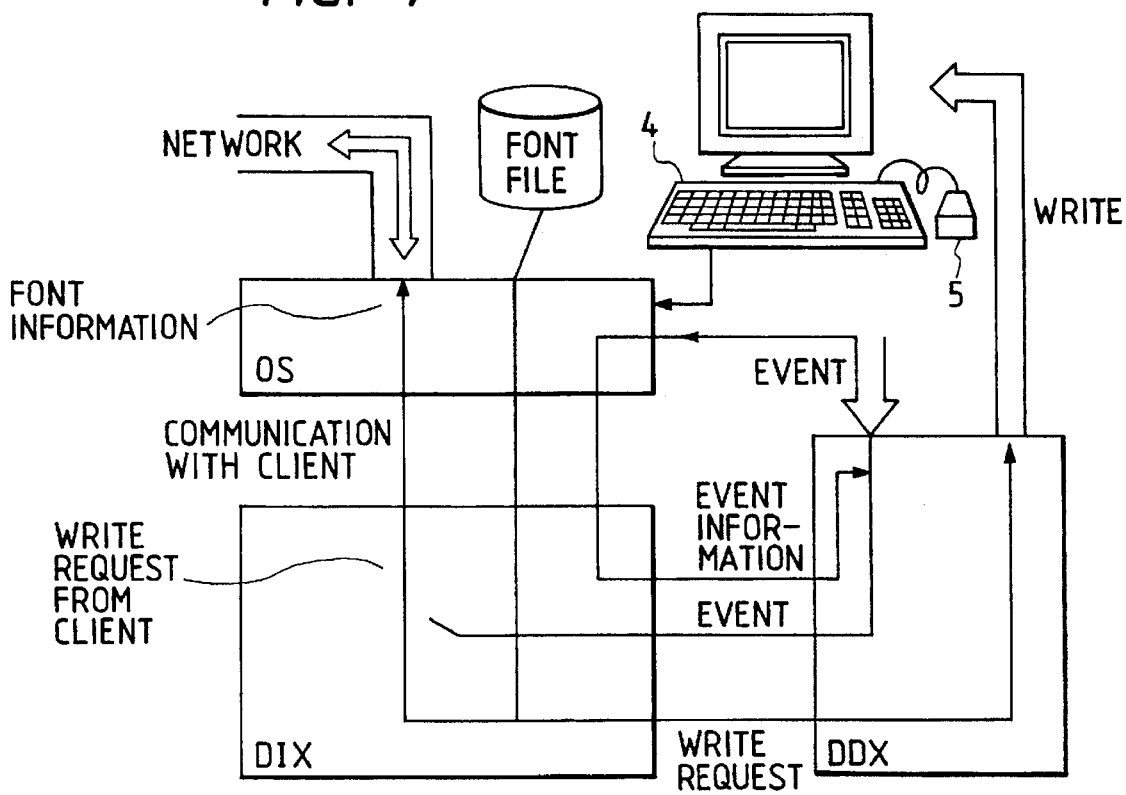
FIG. 7 illustrates the structures of the modules of an X window system.

As shown in FIG. 7, the server 14 is composed of four sections DIX, OS, DDX and EXT (EXT is omitted in FIG. 7). The DIX is a portion which does not depend upon the device or the OX, the DIX being arranged to form a loop for use to await an event and branch to a process and to control various resources. The OS is a portion to serve as an interface in the broad sense of the word with the OS in order to establish an access to the file system. DDX is a portion which depends upon devices such as the keyboard 4, the mouse 5, and the display, and the like. EXT is a portion for supporting the extension of X protocol to be described later and is not used if a special function is not provided. On the other hand, the client 15 is an application which acts on the X window system, the client 15 being allowed to be operated on another machine connected by a network as an alternative to the machine in which the server 14 is operated.

Then, the operation of the X window system will now be described while centering the server 14 and the client 15.

First, the server 14 detects the hardware event and notifies it to the client 15. The client 15 performs a process in accordance with the received event and issues a request such as a picture draw request to the server 14. The server 14 performs a process in accordance with the request supplied from the client 15, and issues a picture draw command to the graphic device 13 via the display driver, or transmits information requested by the client 15. The X window system is operated based on the aforesaid server/client communication. The transmission and the receipt of information between the server 14 and the client 15 is performed in conformity with a predetermined regulation called the X protocol. The X protocol is characterized by independence from a specific hardware device or the OS and network transmissivity, the X protocol defining the X window system. Incidentally, X library (Xlib) is prepared to serve as an interface with the server 14 of the client program, enabling programming which does not depend a device to be performed.

The X window system utilizes the aforesaid multitask function and the network function of the UNIX and has attained a position as the standard window system on the system which uses the UNIX. The X window system shown in FIG. 1 which illustrates the embodiment of the present invention is included in the host computer, and the hardware attribute of the graphic device 13 is described in DDX and OS of the X window system.

Then, the processes of the hardware event and the client request to be performed by the server will now be described.

The server 14 is a process which is made to correspond so as to control one work station (the screen, the keyboard 4 and the mouse 5), the server 14 being arranged to supply service to a plurality of processes, that is a plurality of clients 15. Incidentally, the term "process" used hereinbefore is meant an environment in which a program is executed. One process is composed of three segments, that is a command segment, a user data segment and a system data segment. The program can be executed by a plurality of processes in which one program for use to initialize a command and user data is made to run in parallel in terms of the time. The multitask system executes the aforesaid plural processes in parallel in a time sharing manner. The time sharing operation of a plurality of the processes is charged by the UNIX kernel. On the other hand, scheduling of the server 14 is an operation to determine the sequential order of processing the generated picture draw request and the hardware (H/W) event.

Figure 10:
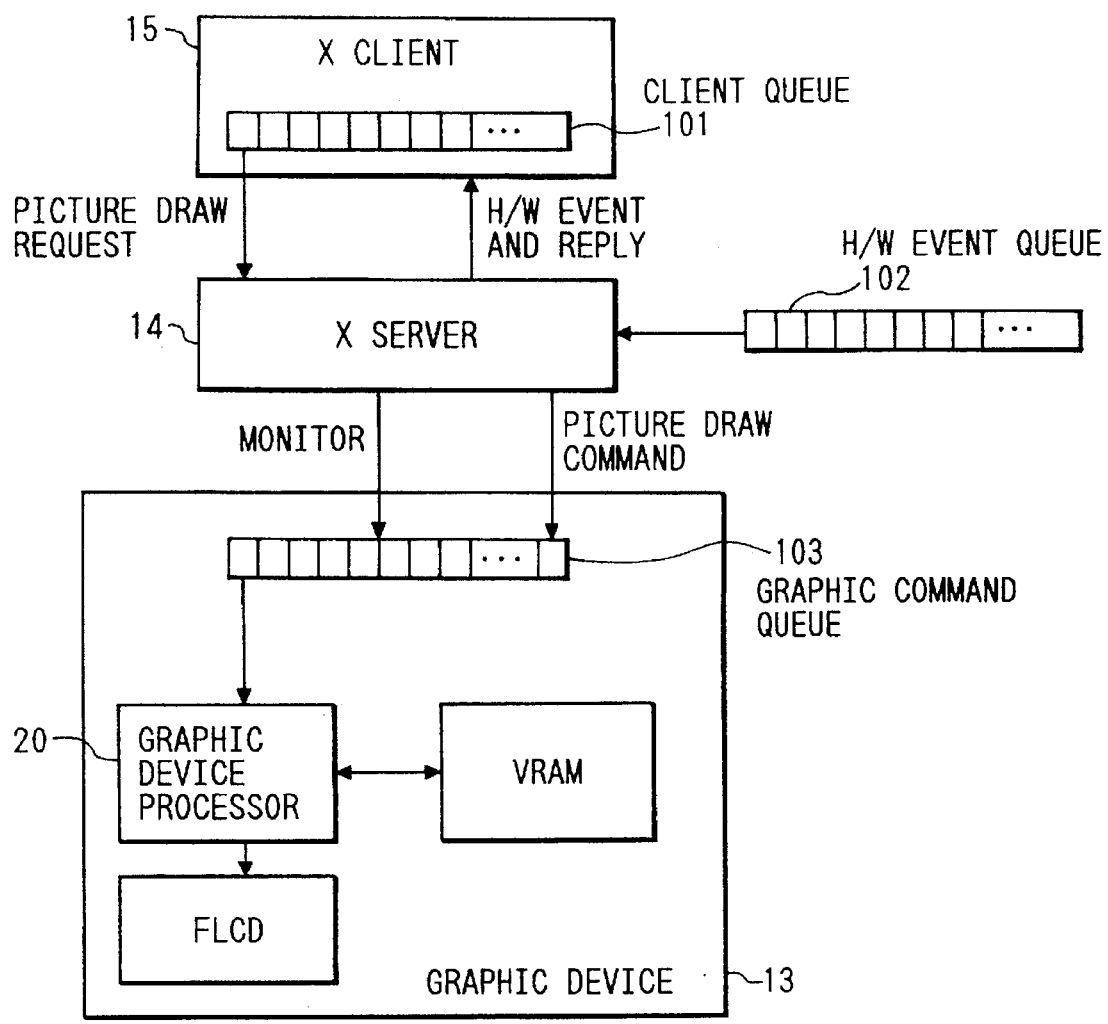
FIG. 10 is a block diagram which illustrates a queue system according to this embodiment.

FIG. 10 illustrates a queue (waiting matrix) system according to an embodiment of the present invention for giving service to the client 15.

Usually, the client 15 is formed into an event drive type program. That is, the client 15 calls a predetermined processing routine in accordance with an input made by a user by using the keyboard 4 or the mouse 5 so as to perform an output on a display. In order to achieve this object, the server 14 detects the H/W even made by using the keyboard 4 or the mouse 5 so as to notify it, which has been formed into a shape determined by the protocol between the server and the client, to the determined client 15. According to this embodiment, the server 14 periodically checks the presence of the H/W events stored in an H/W event queue 102. If H/W events are present, the server 14 sequentially picks up the H/W events to notify them to the client 15. The client 15 processes the H/W event in accordance with its contents, and (if necessary) generates picture draw requests to be supplied to the server 14, the picture draw requests being registered to the client queue 101 for each client 15 in the generating order.

A multiplicity of the picture draw requests registered by a plurality of clients 15 are sequentially read and processed by the server 14 in accordance with a certain course. The server 14 consecutively reads the picture draw requests by a number of Nmaxreq or less from the clients 15 having the client queues 101 to which the picture draw requests are registered, and then converts the picture draw requests into picture draw commands, the picture draw commands being then transferred to a graphic command queue 103 in the graphic device 13. As a result, a plurality of the picture draw requests generated by a plurality of the clients 15 are sequentially processed by the server 14 in a single task manner. Hence, the command transferred to the graphic command queue 103 is processed by the graphic device processor 20 basically asynchronous to the server 14. Therefore, the command transferred to the queue is processed after all of the processes of the prior commands have been completed. The method of writing the commands to the graphic command queue 103 by the host processor side and the method of reading the commands from the aforesaid queue by the graphic device processor 20 will be described later.

Incidentally, the reason why the operation of picture-drawing the H/W event such as the event made by the mouse 5 cannot be executed real time is that the processing speed of the elements in the graphic device 13 is not sufficiently high and therefore a large quantity of non-processed commands is left in the graphic command queue 103 at the time of the generation of the subject event. Therefore, it can be considered that the real time characteristics of the picture drawing operation can be improved by decreasing the number of the mouse events to be notified by the server 14 to the client 15 (in general, the number of the generations of the mouse movement events can be decreased by adding a plurality of movement displacements in a vector manner similarly to a case where sampling is performed coarsely). The reason for this lies in that the number of the issued picture draw events depends upon the number of the mouse events notified by the server 14 to the client 15. That is, the number of the picture draw requests generated by the client 15 decreases if the number of the mouse events decreases, causing the number of the commands to be issued by the server 14 to be decreased. As a result, the load of the graphic device processor is reduced. Hence, the processing speed of the elements in the graphic device 13 is able to sufficiently follow the speed at which the picture draw command is generated.

The server 14 notifies the H/W even (the mouse event included) to the corresponding client 15 as described above, the above notification being performed in accordance with Process Input Events () routine included in the DDX layer of the server 14. The Process Input Events () routine is periodically called by a loop called a "Dispatch loop" in Dispatch () routine included by the DIX layer of the server 14. Usually, the Dispatch loop reads, from the client queue 101, requests generated by a plurality of the clients 15 in accordance with a certain scheduling course, the Dispatch loop being arranged to then start a processing routine in accordance with the type of the request. If the request is the picture draw request, a routine in the DDX layer is called ultimately, and a command is transmitted to the graphic device 13.

Then, the steps of processing the H/W even and the client request performed in the Dispatch loop will now be described with reference to a flow chart shown in FIG. 12. In the Dispatch loop, in step S1, if the H/W event is present in the H/W event queue 102, the Process Input Events () function is called so as to process all of the events in the queue. That is, the event is notified to the corresponding client 15 in accordance with the protocol. In next step S2, waiting for the generation of any one of the following facts is performed in step S2:

(i) An H/W event is generated.

(ii) A request is transmitted from the client 15 connected to the server 14.

(iii) A new client 15, which has not been connected to the server 14, request a connection.

If any one of the aforesaid facts has been generated, required information is set, and then the flow proceeds to next step S3.

In step S3, a connection process is performed if a request of a connection is made by the new client 15 in the previous step. In next step S4, a discrimination is made as to whether there is a client 15 having a request, the process of which is awaited. If there is no client 15 having the request left in the client queue 101, the flow returns to step S1. If there is the client 15 having the request left in the client queue 101, the client 15 having the request to be processed is set in next step S5.

After the process in step S5 has been completed, the flow proceeds to step S6 in which a discrimination is made as to whether or not the process of the request from the other client 15 is performed. If the process is performed, the flow returns to step S4. If the process is not performed, the flow proceeds to step S7 in which Process Input Events () function is called. In next step S8, a discrimination is made as to whether or not there is a request to be processed in the client queue 101 of the client 15 having the request to be processed at present. If no request is left, the flow returns to step S4. If a request is left, the flow proceeds to step S9. In step S9, Read Request From Client () function is called so as to read the request from the client queue 101. In next step 10, a discrimination is made as to whether or not the request has been correctly read. If the same has not been read correctly, the flow returns to step S6. If the same has been read correctly, a process routine which corresponds to the type of the request is started in step S11. Then, the flow returns to step S8.

In the thus arranged algorithm, the clients 15 each having the request which must be processed by the server is examined at the certain time, and the requests are processed sequentially for each client 15. When the server 14 has processed the requests from a certain client 15 by a Nmaxreq or less, the process of the request from the client 15 is interrupted and the process of the request from the other client 15 is started.

Figure 8:
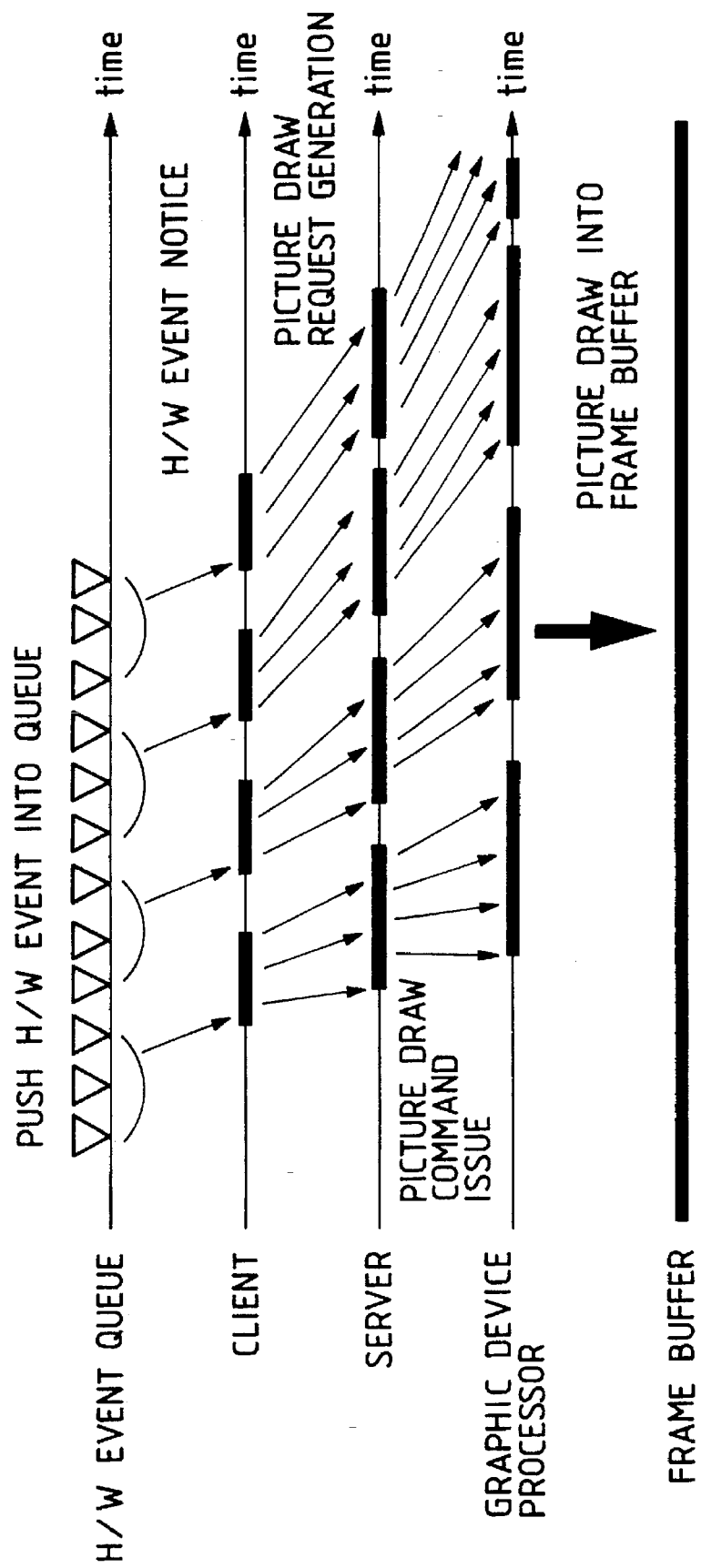
FIG. 8 illustrates the time sequential operation state change of each module of the conventional example from the generation of the hardware event to the actual picture drawing operation.
Figure 12:
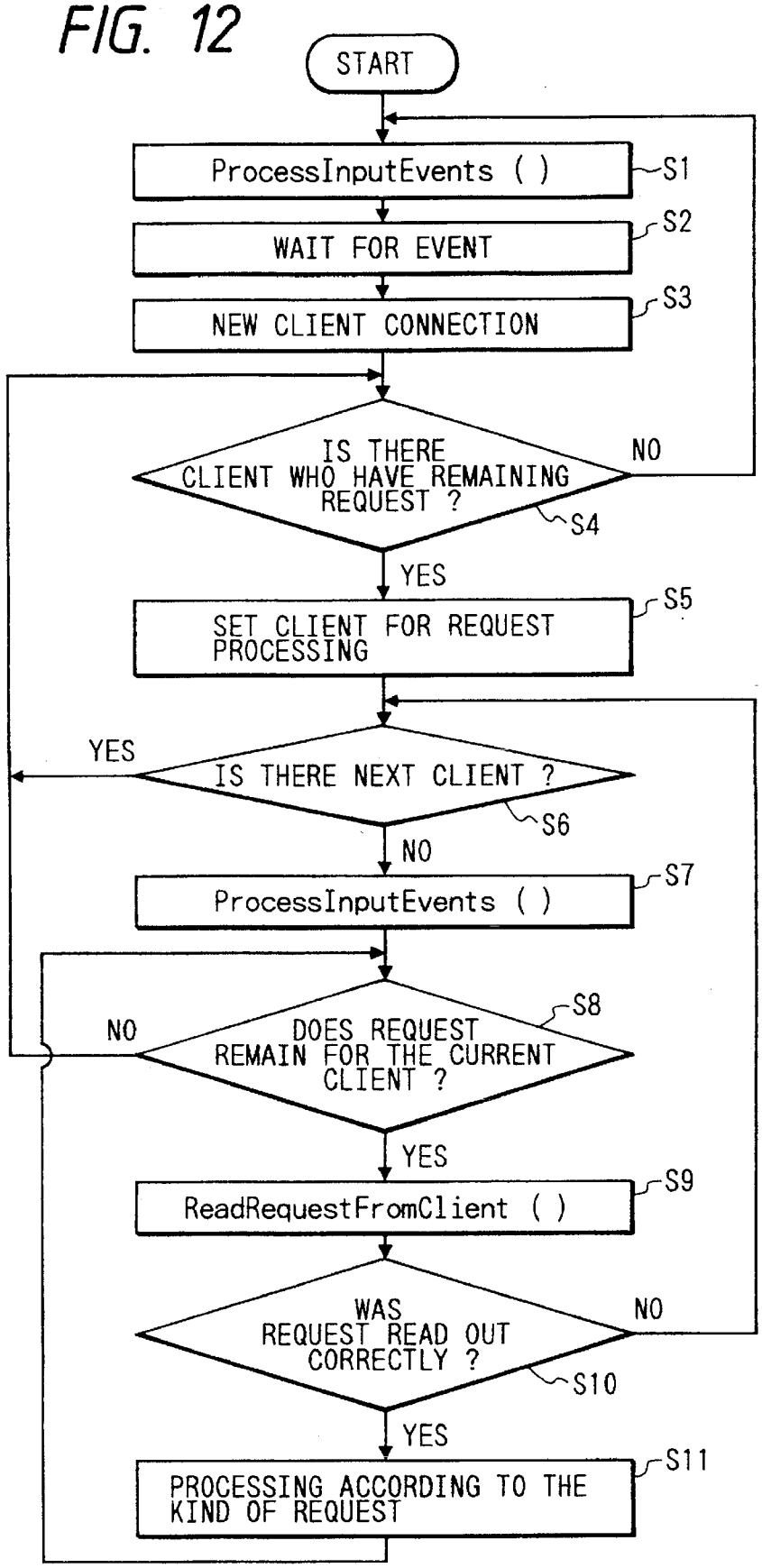
FIG. 12 is a flow chart which illustrates a Dispatch loop in an X server.

As shown in FIG. 12, the H/W event is processed every time prior to processing of each request. The aforesaid arrangement is employed based upon an idea that the server 14 must as much as quickly and frequently notify the generated H/W event to the client 15. However, it is apparent that, if the server 14 consecutively notifies the H/W event to the client 15 regardless of the state in which the command is processed in the graphic device 13, a problem shown in FIG. 8, that is, a time delay undesirably takes place between the generation of the H/W event and the picture drawing operation. Hence, any means must be provided for the purpose of causing the H/W event to be processed in accordance with the state in which the command is processed in the graphic device 13. According to the present invention, the aforesaid problem is overcome by arranging the structure in such a manner that the number of the non-processed commands in the graphic command queue 103 in the graphic device portion is monitored by Read Request From Client () function so as to examine the state where the command is processed, and the notification of the H/W event to the client 15 is controlled by the Process Input Events () function in accordance with the result of the examination.

Then, the structure and a method of using the graphic command queue will now be described.

The structure and a method of using the graphic command queue 103 will now be described prior to making the description about the Read Request From Client () function and the Process Input Events () function.

Figure 13:
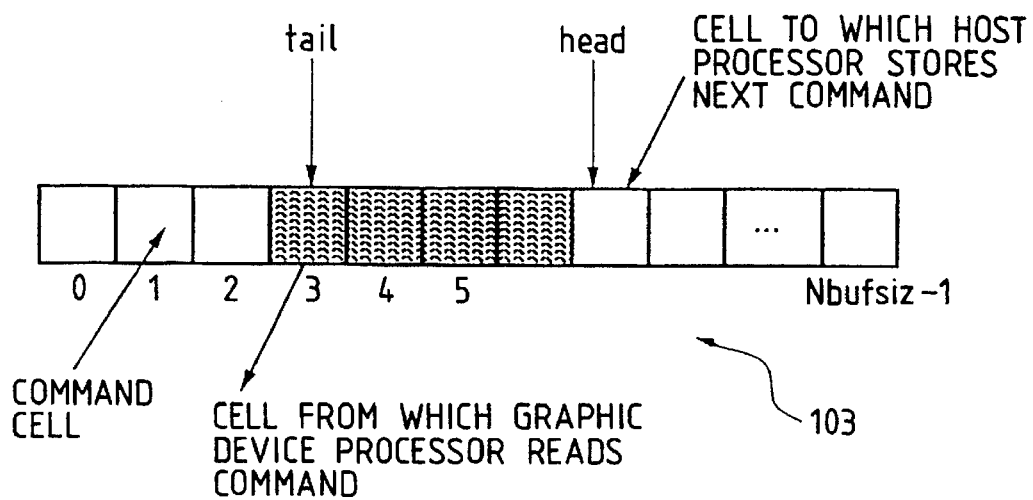
FIG. 13 illustrates the structure of a graphic command queue in a graphic device.

FIG. 13 illustrates the structure of the graphic command queue 103. The queue 103 is made of Nbufsiz cells which are respectively given cell Nos. "0" to "Nbufsiz-1". Each cell stores only the header portion of the graphic command, the argument and data of the graphic command being present in another memory region. The header portion has the address of the memory region.

Figure 14:
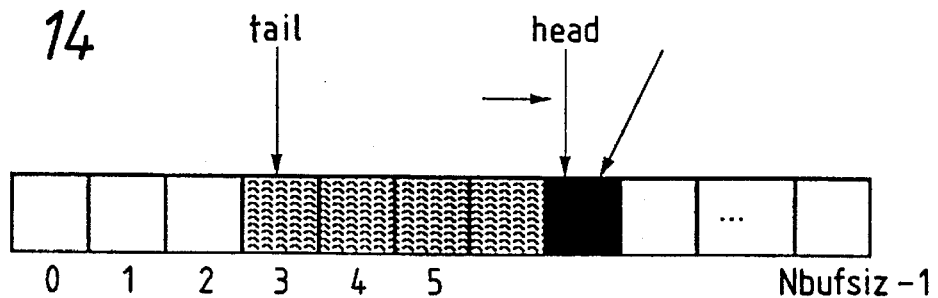
FIG. 14 illustrates an access method to the graphic command queue.
Figure 15:
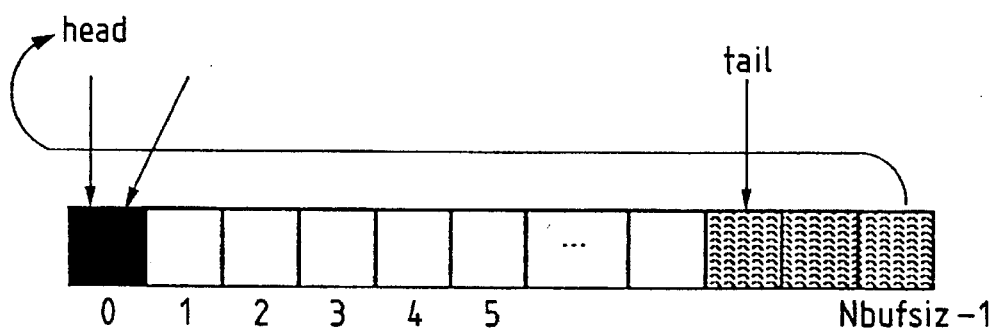
FIG. 15 illustrates an access method to the graphic command queue.
Figure 16:
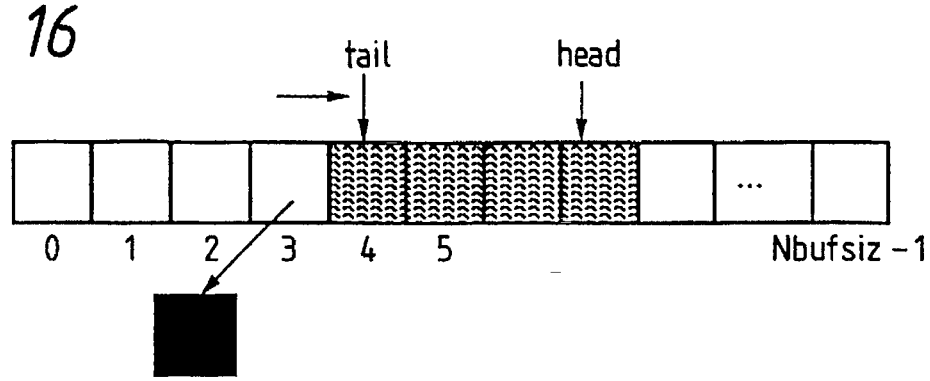
FIG. 16 illustrates an access method to the graphic command queue.

As shown in FIG. 14, a host processor 1 sequentially writes the graphic command (hereinafter called the "graphic command" though the head portion of the graphic command is written to be exact) starting at the 0-th cell in a direction in which the cell No. increases. When the writing operation reaches the final cell as shown in FIG. 15, the operation returns to the 0-th cell. On the other hand, the graphic device processor 20 reads and processes the commands to follow the writing operation performed by the host processor 1 in the sequential order in which the host processor 1 has stored the commands.

Figure 17:
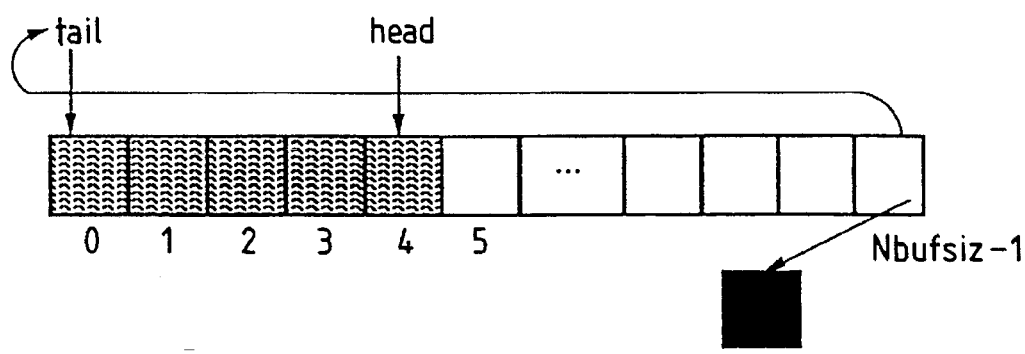
FIG. 17 illustrates an access method to the graphic command queue.
Figure 18:
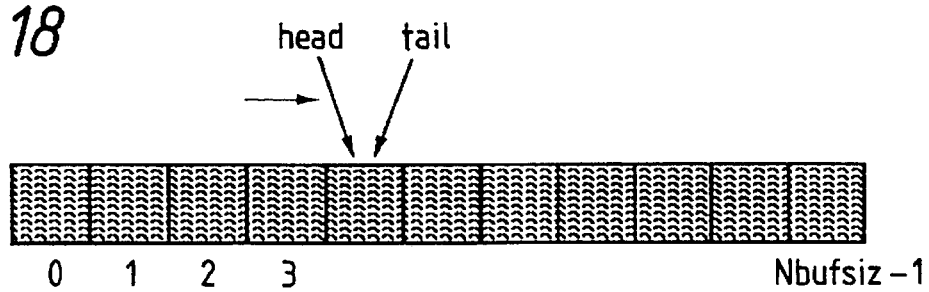
FIG. 18 illustrates a state of the graphic command queue.
Figure 19:
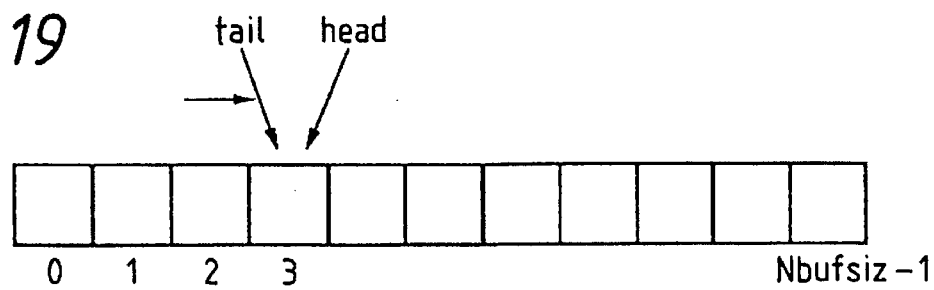
FIG. 19 illustrates a state of the graphic command queue.

In order to control the writing position performed by the host processor 1 and the reading position performed by the graphic device processor 20, variables head and tail are prepared. As shown in FIG. 13, the variable head stores the No. of the cell located next to the latest cell to which the command has been written by the host processor 1, while the variable tail stores the No. of the cell which is then read by the graphic device processor 20. That is, the host processor 1 increases the variable head whenever it writes one graphic command, while the graphic device processor 20 increases the variable tail whenever it reads one graphic command. However, when the operation reaches the final cell of the queue as shown in FIGS. 15 and 17, clearing to zero is performed so as to return to the leading portion. If head ≠ tail in both the writing operation and the reading operation, the operation may be performed as it is. However, if head=tail, a special measurement must be taken. That is, in a state where the cue is filled with the commands and in a state where the same is empty, head=tail. Therefore, writing must be performed after the fact that the graphic device process 20 is in an idle state has been confirmed in order to prevent overwriting at the time of the writing operation.

In order to confirm the idle state, for example, the graphic device processor 20 must always set two flags to be the same value if it is in the idle state. As a result, if the examination of the values of the flags made after the host processor 1 has set different values to the two flags results in that they are set to the same value by the graphic processor 20, the idle state can be confirmed. If the values of the two flags are different after a certain period has passed, a discrimination is made that the subject state is not the idle state.

On the other hand, the graphic device processor 20 may perform reading as it is in a case where head≠tail. In a case where head=tail, the discrimination is made as follows: The graphic device processor 20 sets a certain flag in a case where head=tail+1 immediately before the graphic device processor 20 reads the graphic command and increases the variable tail. If head=tail before the graphic device processor 20 reads the command, a reference is made to the aforesaid flag. If the flag has been set, the queue is empty and therefore reading is inhibited. If the flag is not set, the queue is filled with the commands and therefore reading is performed. If the aforesaid flag is used, clearing must be performed regardless of the value of the flag in a case where head≠tail.

Then, the Process Input Event () function and Read Request From Client () function called from the dispatch loop shown in FIG. 12 will now be described.

Figure 20:
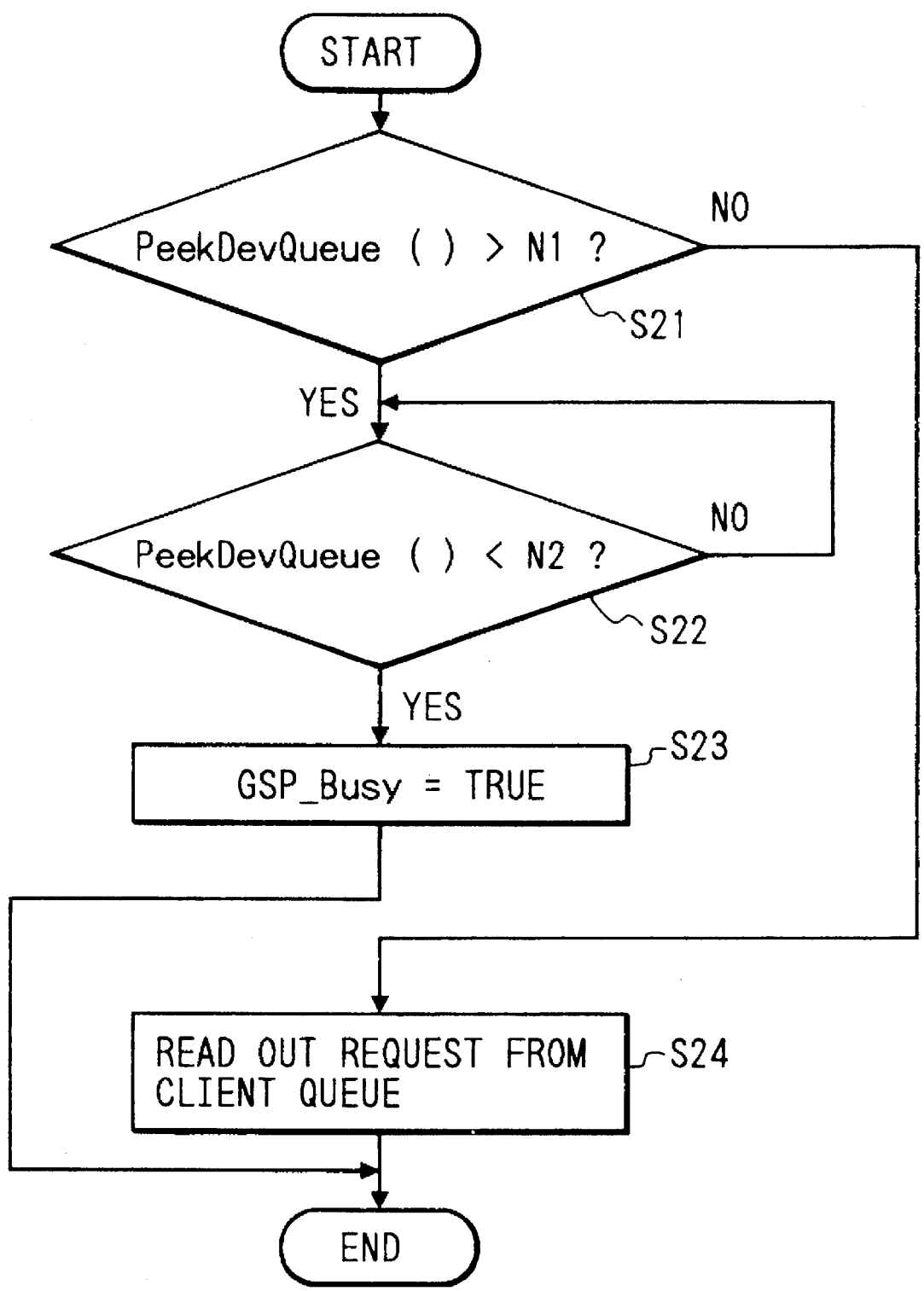
FIG. 20 is a flow chart which illustrates Read Request From Client () routine shown in FIG. 12.

FIG. 20 illustrates an embodiment of the Read Request From Client () function. Referring to FIG. 20, the Read Request From Client () function first calls Peek Dev Queue () function in step S21. The Peek Dev Queue () function opens an imaginary device for the graphic device 13 so that the values of the aforesaid variables head and tail as will be described with reference to FIG. 21. In accordance with the aforesaid values, the number of the graphic commands left unprocessed in the graphic command queue 103 is calculated and the value is returned. In step S21, a discrimination is made as to whether or not the value returned from the Peek Dev Queue () function is larger than predetermined value N1. If the value is larger than N1, the Peek Dev Queue () function is again called in step S22. Step S22 is repeatedly executed until the returned value becomes smaller than predetermined value N2. Then, flag GDevbusy is set to TRUE in step S23 and returning is performed. If the first returned value of the Peek Dev Queue () function is N1 or less, a request is read from the client queue in step S24 and returning is performed.

The Read Request From Client () function described above means that, if the commands are left unprocessed in the graphic command queue 103 by a number which is larger than a predetermined number, that is, if the processing speed at the graphic device 13 cannot catch up with the command issuing speed, the flag GDevbusy is set to TRUE. Furthermore, a fact that the number of the unprocessed commands becomes smaller than another predetermined value is waited for, so that the command issuing speed to the graphic device 13 is controlled.

Figure 21:
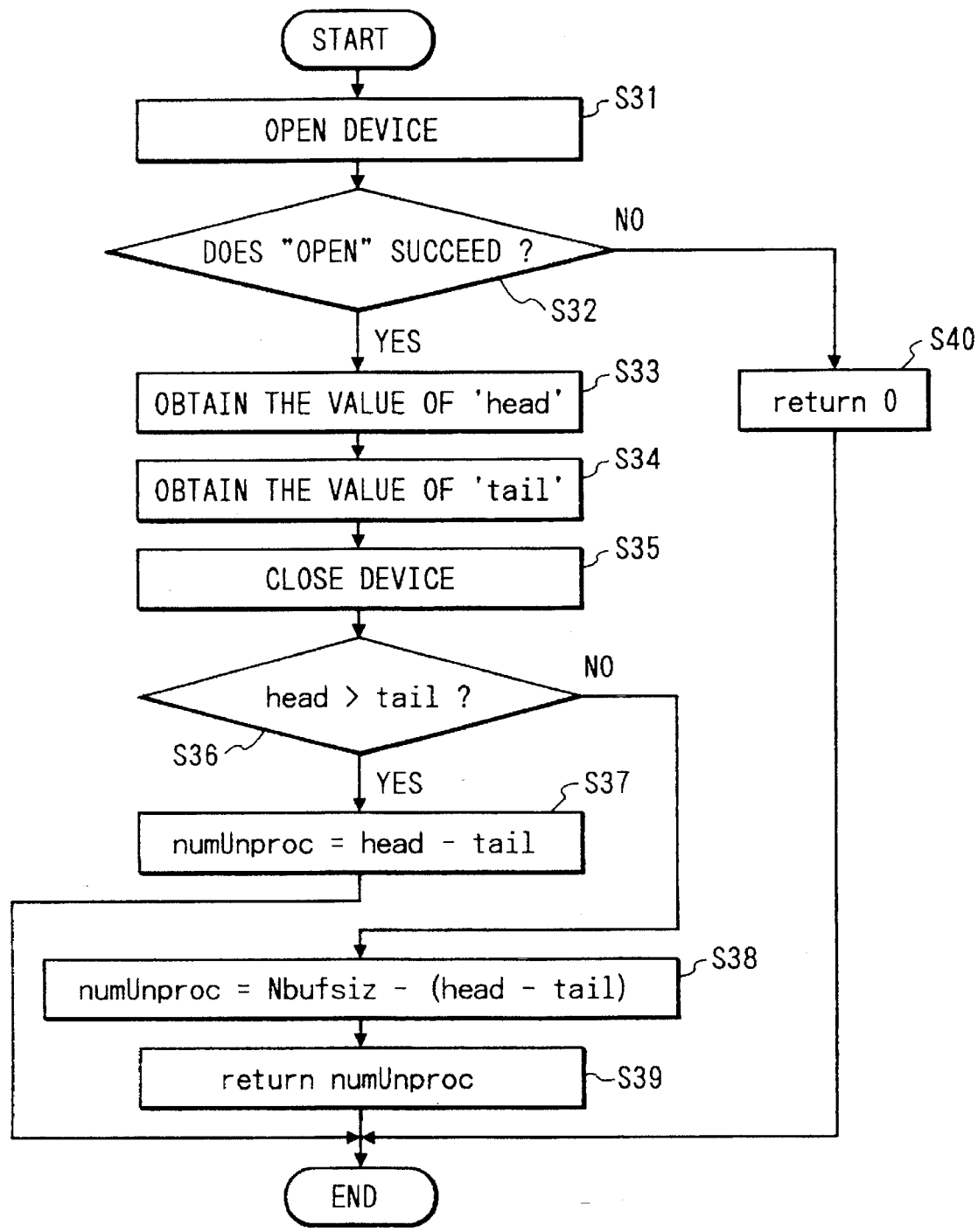
FIG. 21 is a flow chart which illustrates Peek Dev Queue () routine shown in FIG. 20.

Referring to FIG. 21, the Peek Dev Queue () function will now be described. First, the imaginary device for the graphic device 13 is opened in step S31. In next step S32, a discrimination is made as to whether or not the opening has been resulted in successful. If it has succeeded, the flow proceeds to step S33. If it has failed, returning to a returning value "0" is performed in step S40.

In step S33, the aforesaid variable head is obtained, the value of the variable tail is obtained in step S34, and the device is closed in step S35. In step S36, a discrimination is made as to whether or not the variable head is larger than the variable tail. If it is larger than the variable tail, head-tail is stored in variable numUnproc in step S37. In a case where the variable head is not larger than the variable tail in step S36, Nbufsiz-(head - tail) is stored in the variable numUnproc in step S38. That is, the present number of the graphic commands left unprocessed in the graphic command queue 103 is calculated. After performing steps S37 and S38, returning to a returning value of the variable numUnproc is performed in step S39.

In the Process Input Events () function, a reference is, in step S51, made to the flag GDevBusy to which TRUE may be set in the Read Request From Client () function shown in FIG. 20. If TRUE has been set, the flow proceeds to step S52. If the same has not been set, the flow proceeds to step S55. In step S52, a discrimination is made as to whether or not the value of variable NSKIP is larger than zero. If NSKIP>0, the flow branches to step S54. If a discrimination is made in step S52 that the relationship NSKIP>0 is not held, a certain constant value NADD is added to the variable NSKIP in step S53. In next step S54, GDevBusy is cleared (FALSE is set). In next step S55, a discrimination is made as to whether or not the value of the variable NSKIP is larger than zero. If NSKIP >0 including a case where GDevBusy has not been first set, the variable NSKIP is increased by one in step S56, and then returning is performed. If NSKIP=0 in step S55, Handle Events () function is called in step S57 and returning is performed.

In the Handle Events () function, a discrimination is first made in step S61 as to whether or not the H/W event is present in the buffer. If the H/W event is present, the H/W events stored in the H/W event queue 102 are one by one read in step S62 so as to notify them to the client 15 in accordance with Write To Client () function. That is, the H/W event is read in step S62, and then a discrimination is made in step S63 as to whether or not the subject event is the keyboard event. If the subject event is the keyboard event, the keyboard event is processed in step S66, and the flow returns to step S61. If a discrimination is made in step S63 that the subject event is not the keyboard event, a discrimination is made in step S64 as to whether or not the subject event is the mouse button event. If it is the mouse button event, the mouse button event is processed in step S67 and the flow returns to step S61. If a discrimination is made in step S64 that the subject event is not the mouse button event, the amount of the movement of the mouse is accumulatively added and the flow returns to step S61. If a discrimination is made in step S61 that the H/W event is not present in the buffer, the mouse movement event is processed in step S68 and returning is performed.

Figure 22:
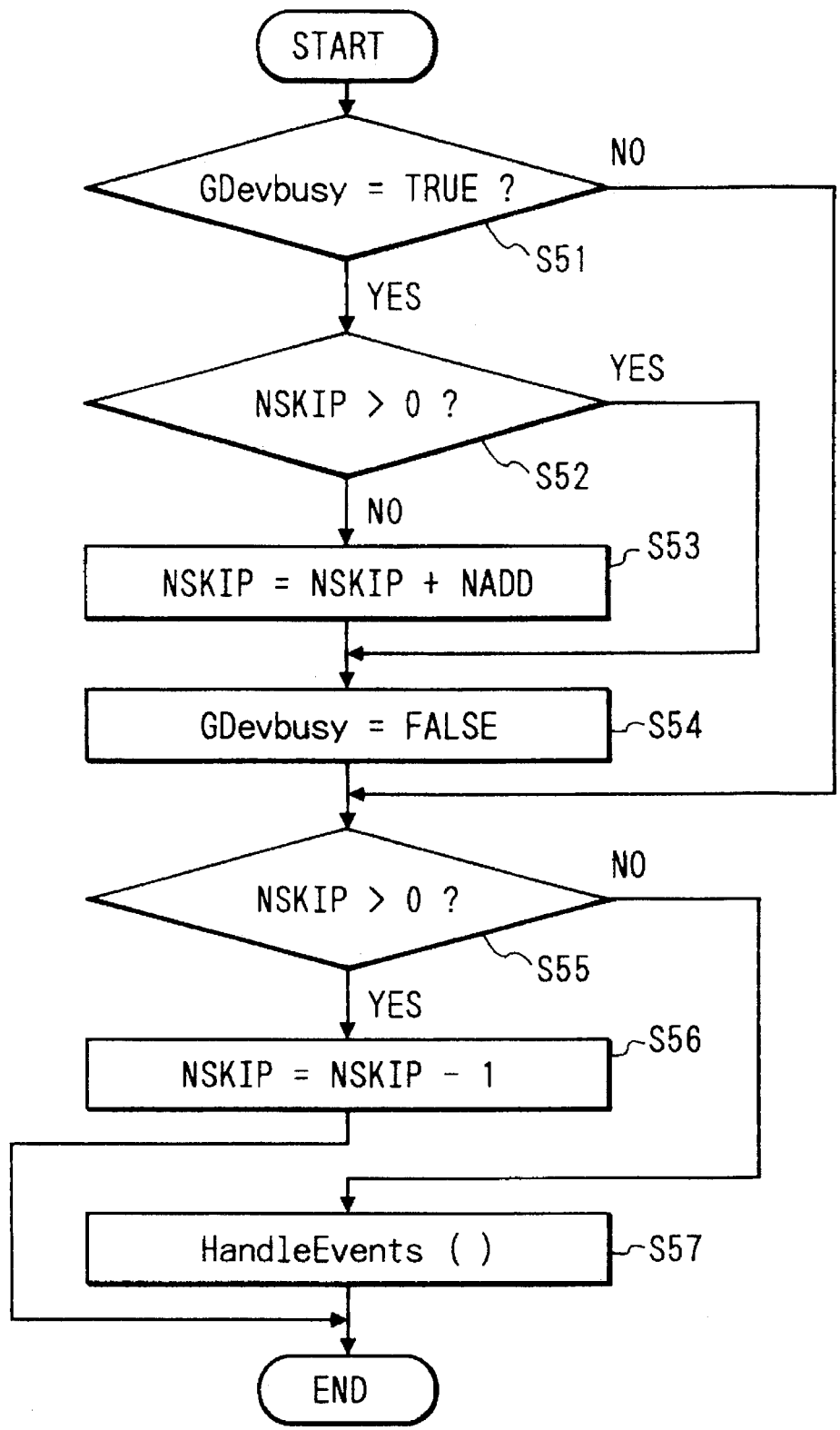
FIG. 22 is a flow chart which illustrates Process Input Events () routine.

In the Process Input Events () function shown in FIG. 22, if NSKIP>0, the Handle Events () function is not called and returning is performed. That is, reading of the event from the hardware event queue and the notification to the client are not performed. The following fact must be paid attention in the Handle Events () function: the key event and the mouse button event are notified to the client 15 after they have been read out, and the mouse movement is notified to the client 15 as one mouse movement event in such a manner that the amount of the movements of a plurality of events are added in a vector manner and all of the events stored in the H/W event queue 102 have been read before the notification. As a result, a plurality of the mouse movement events are made to be one mouse-movement event and the number of the mouse movement events to be notified to the client can be decreased.

Figure 9:
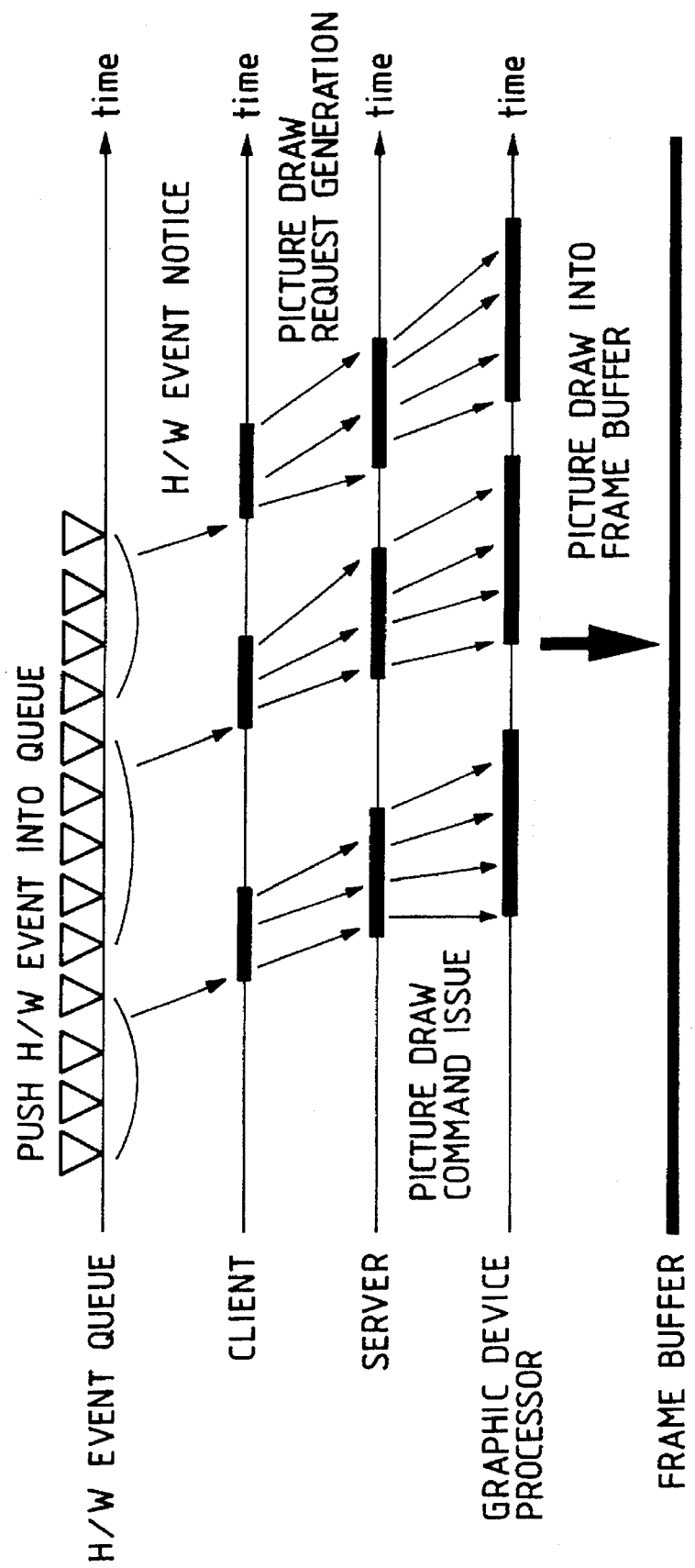
FIG. 9, as compared with the conventional example shown in FIG. 8, illustrates the time sequential operation state change of each module according to this embodiment from the generation of the hardware event to the actual picture drawing operation.
Figure 11:
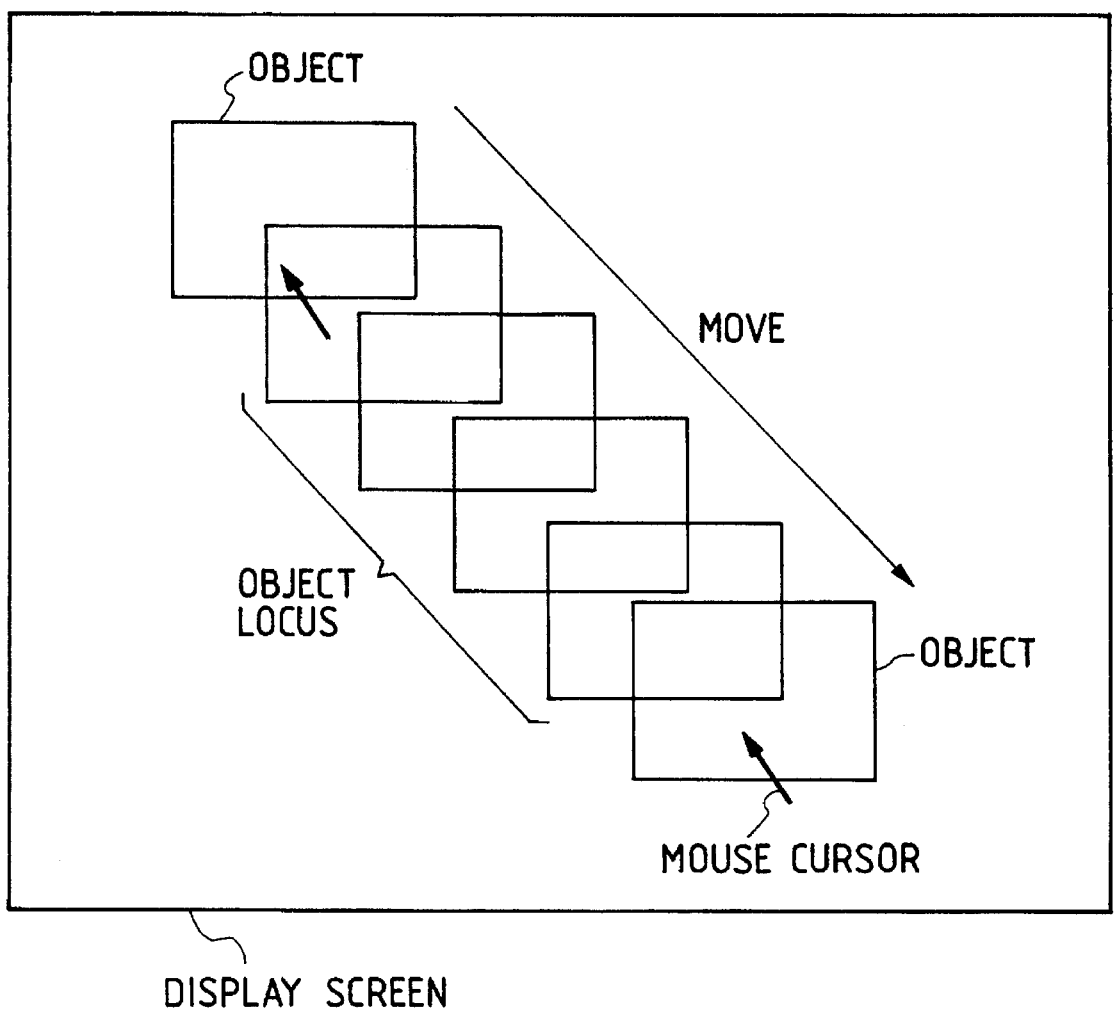
FIG. 11 illustrates a "direct operational" user interface arranged to use a mouse.
Figure 23:
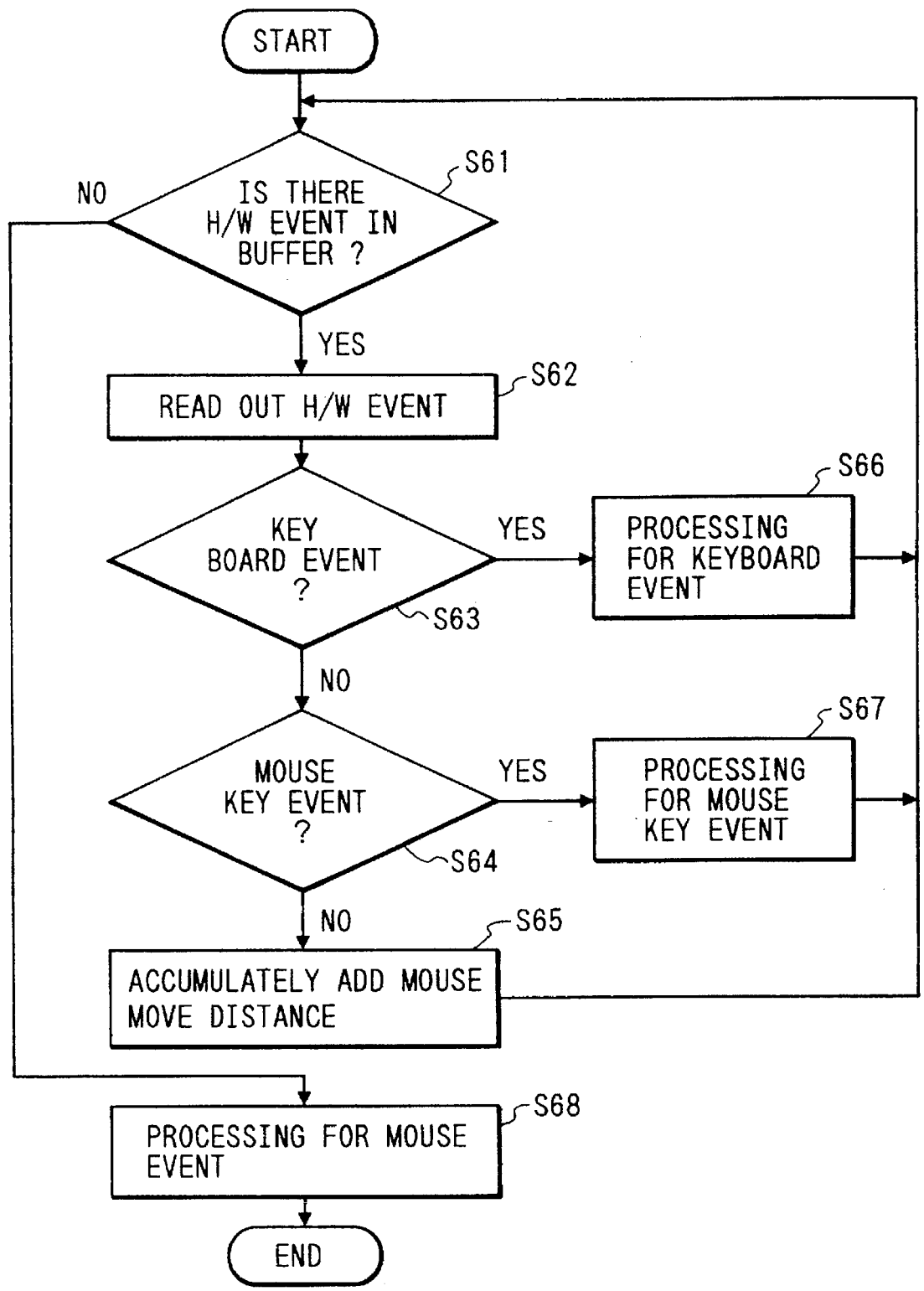
FIG. 23 is a flow chart which illustrates Handle Events process shown in FIG. 22.

The novelty of the present invention lies in that reading of the hardware event and the notification to the client are continuously skipped for a predetermined period in accordance with the state where the command is processed by the graphic device. That is, in the Read Request From Client () function, if a discrimination has been made that the processing speed in the graphic device 13 has been relatively lowered, this fact is notified to the Process Input Events () function via the flag GDevBusy. Then, if GDevBusy is once set in the Process Input Events () function, the processing function Hand Events () of the H/W event are skipped by continuous NADD times (NADD is an adequate value) whenever the Process Input Events() function is called. The arrangement made that the process of the H/W event is skipped will cause a further large number of events to be gathered in the H/W event queue 102, and the number of the events to be read at the next process of the H/W event is increased. As shown in FIG. 23, the more the number of the events to be read in one Handle Events () function increases, the more the degree of the reduction of the number of the mouse movement events becomes. As a result, the mouse movement events to be notified to the client 15 is decreased, the requests to be generated by the client 15 is decreased, and the picture draw commands to be finally processed by the graphic device 13 is decreased. Therefore, the number of the commands left unprocessed when the command is stored in the graphic command queue 103 is decreased, so that time taken from the storage to the process is shortened. For example in a case shown in FIG. 11, the time sequential flow of the process from the detection of the H/W event to the picture drawing operation is changed from a state shown in FIG. 8 to a state shown in FIG. 9. As a result, in the case shown in FIG. 9, the time taken from the picture drawing operation relating to the detected event to the event detection can be shortened as compared with that shown in FIG. 8.

As described above, according to the present invention, the state where the picture draw command is executed is monitored, and if the state of the execution exceeds a predetermined degree, the ensuing hardware event notification process is skipped for a predetermined period. The time taken from the generation of the hardware event to the picture drawing operation can be shortened, causing a system exhibiting satisfactory response and excellent real time characteristics to be realized.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A data processing apparatus comprising:
   (1) host processor means comprising (a) multitask means for executing a plurality of application program processes in a time sharing manner, (b) hardware event detection means for detecting generation of a hardware event, (c) hardware event notifying means for notifying the generated hardware event to a predetermined client program process of a plurality of client program processes, and (d) scheduling means for changing picture draw requests issued from said application program processes to a serial picture draw request in the time sharing, and for outputting a serial picture draw command in accordance with said serial picture draw request; and
   (2) graphic device means for controlling a display device in accordance with said picture draw command transferred from said scheduling means,
   wherein said event notifying means comprises means for monitoring an executing state of a picture draw command transferred from said graphic device means, and for skipping the executing of the notifying in accordance with the executing state of the picture draw command.

2. A data processing apparatus according to claim 1, wherein said event notifying means processes said hardware event while giving the same priority to other processes when said hardware event has been generated, that is, sequentially stores said hardware events in a hardware event queue.

3. A data processing apparatus according to claim 2, wherein said hardware event is generated in accordance with an operation of a key input device such as a keyboard or an instruction device such as a mouse, a writing pen, a stylus, a touch screen or a track ball.

4. A data processing apparatus according to claim 1, wherein said scheduling means constitutes a multiwindow on a screen of said graphic device.

5. A data processing apparatus according to claim 1, wherein said graphic device means performs a display on a screen in accordance with said picture draw command.

6. A data processing apparatus according to claim 1, wherein said host processor runs said scheduling means as one process.

7. A data processing apparatus according to claim 1, wherein said scheduling means reads said picture draw request from a plurality of said application program processes, exchanges the request with a command, and transfers said command to said graphic device means.

8. A data processing apparatus according to claim 2, wherein said hardware event notifying means has a function which acts, when said hardware event queue includes a plurality of indicating device movement events, to, in a vector manner, add a mouse movement amount included by a plurality of said indicating device movement events so as to convert them into one movement event.

9. A data processing apparatus according to claim 1, wherein said graphic device means includes a ferroelectric liquid crystal display panel device.

10. A data processing apparatus comprising:
    a host computer comprising (a) an operator operation device having a local processor for drawing an image in accordance with a picture draw command to a display panel and generating a graphic device hardware event, (b) client execution means for running a picture draw process and (c) server means for reading a picture draw request and the hardware event from said picture draw process, for scheduling the picture draw request, for exchanging the picture draw request with a picture draw command, for transferring said picture draw command to said local processor, and for notifying said hardware event to said picture draw process,
    wherein said server means includes means for examining an executing state of the picture draw command and for notifying a movement event stored in a hardware event queue without executing a reading of said hardware event and notifying the hardware event to said process in a predetermined period if a number of non-processed commands is larger than a predetermined value.

11. A data processing apparatus according to claim 10, wherein said display is a ferroelectric liquid crystal panel display.

12. A data processing apparatus according to claim 10, wherein said server supplies a picture draw command whereby a multiwindow is formed on said display to said local processor.

13. A display system comprising a data processing apparatus having:
    (1) host processor means comprising (a) multitask means for executing a plurality of application program processes in a time sharing manner, (b) hardware event detection means for detecting generation of a hardware event, (c) hardware event notifying means for notifying the generated hardware event to a predetermined client program process of a plurality of client program processes, and (d) scheduling means for changing picture draw requests issued from a plurality of said application program processes to a serial picture draw request in the time sharing, and for outputting a serial picture draw command in accordance with said serial picture draw request; and (2) graphic device means for controlling a display device in accordance with said serial picture draw command transferred from said scheduling means, wherein said event notifying means comprises means for monitoring an executing state of a picture draw command transferred from said graphic device means and for skipping the executing of the notifying in accordance with the executing state of the picture draw command.

14. A display system according to claim 13, wherein said event notifying means processes said hardware event while giving the same priority to other processes when said hardware event has been generated, that is, sequentially stores said hardware events in a hardware event queue.

15. A display system according to claim 14, wherein said hardware event is generated in accordance with an operation of a key input device such as a keyboard or an instruction device such as a mouse, a writing pen, a stylus, a touch screen or a track ball.

16. A display system according to claim 13, wherein said scheduling means constitutes a multiwindow on a screen of said graphic device.

17. A display system according to claim 13, wherein said graphic device means performs a display on a screen in accordance with said picture draw command.

18. A display system according to claim 13, wherein said host processor runs said scheduling means as one process.

19. A display system according to claim 13, wherein said scheduling means read said picture draw request from a plurality of said application program processes, the request with a command, and transfers said command to said graphic device means.

20. A display system according to claim 14, wherein said hardware event notifying means has a function which acts, when said hardware event queue includes a plurality of indicating device movement events, to, in a vector manner, add a mouse movement amount included by a plurality of said indicating device movement events so as to convert them into one movement event.

21. A display system according to claim 13, wherein said graphic device means includes a ferroelectric liquid crystal display panel device.

22. A display system comprising a data processing apparatus including:

a host computer processor comprising (a) an operator operation device having a local processor for drawing an image in accordance with a picture draw command to a display panel and for generating a graphic device hardware event, (b) client execution means for running a picture draw process, and (c) server means for reading a picture draw request and the hardware event from said picture draw process, for scheduling the picture draw request, for exchanging the picture draw request with a picture draw command, for transferring said picture draw command to said local processor, and for notifying the hardware event to said picture draw process, wherein said server means includes means for examining an executing state of the picture draw command and for notifying a movement command stored in a hardware event queue without executing a reading of said hardware event and notifying the hardware event to said process in a predetermined period if a number of non-processed commands is larger than a predetermined number.

23. A display system according to claim 22, wherein said display is a ferroelectric liquid crystal panel display.

24. A display system according to claim 22, wherein said server supplies a picture draw command whereby a multiwindow is formed on said display to said local processor.

* * * * *

UNITED STATES PATENT AND TRADEMARK OFFICE
CERTIFICATE OF CORRECTION

| | | |
|---|---|---|
| PATENT NO. : | 5,642,509 | Page 1 of 4 |
| DATED : | June 24, 1997 | |
| INVENTOR(S) : | OHSHIMA ET AL. | |

It is certified that error appears in the above-identified patent and that said Letters Patent is hereby corrected as shown below:

Title page

At [56] References Cited
    U.S. PATENT DOCUMENTS

Insert:  --5,305,454  4/1994  Record et al.  395/650
             5,438,659  8/1995  Notess et al.  395/155--.

At [56] References Cited
    FOREIGN PATENT DOCUMENTS
    "2242418" should read --2-242418--.

At [57] Abstract

Line 3, "shorted" should read --shortened--.

Column 1

Line 5, "continuation-in-part" should read --continuation--.

UNITED STATES PATENT AND TRADEMARK OFFICE
CERTIFICATE OF CORRECTION

| | | |
|---|---|---|
| PATENT NO. : | 5,642,509 | Page 2 of 4 |
| DATED : | June 24, 1997 | |
| INVENTOR(S) : | OHSHIMA ET AL. | |

It is certified that error appears in the above-identified patent and that said Letters Patent is hereby corrected as shown below:

Column 2

Line 45, "present" (second occurrence) should be deleted and
    Line 49, "Clerk" should read --Clark--.

Column 4

Line 26, "even" should read --event--; and
    Line 52, "determines" should read --determine--.

Column 6

Line 27, "The" should read --By the--.

Column 7

Line 20, "Instrument"should read --Instruments--; and
    Line 26, "Instrument." should read --Instruments.--; and
    Line 43, "is" should read --as--.

UNITED STATES PATENT AND TRADEMARK OFFICE
CERTIFICATE OF CORRECTION

PATENT NO. : 5,642,509
DATED : June 24, 1997
INVENTOR(S) : OHSHIMA ET AL.

It is certified that error appears in the above-identified patent and that said Letters Patent is hereby corrected as shown below:

Column 8

Line 38, "Also" should read --Also,--; and
Line 60, "OX," should read --OS,--.

Column 9

Line 6, "system will now be" should read --system--; and
Line 7, "described while" should read --described-- and "client 15" should read --client 15 will now be described--; and
Line 41, "the" should read --by the--; and
Line 64, "even" should read --event--.

Column 10

Line 57, "even" should read --event--.

Column 11

Line 5, "even"should read --event--; and
Line 45, "10," should read --S10,--; and
Line 62, "as much as" should read --as much as possible--.

UNITED STATES PATENT AND TRADEMARK OFFICE
CERTIFICATE OF CORRECTION

PATENT NO. : 5,642,509
DATED : June 24, 1997
INVENTOR(S) : OHSHIMA ET AL.

It is certified that error appears in the above-identified patent and that said Letters Patent is hereby corrected as shown below:

<u>Column 12</u>

Line 56, "cue" should read --queue--; and
    Line 58, "process 20" should read --processor 20--.

<u>Column 13</u>

Line 52, "been resulted in" should read --been--.

<u>Column 14</u>

Line 67, "Hand" should read --Handle--.

<u>Column 17</u>

Line 35, "read" should read --reads--; and

Signed and Sealed this

Thirtieth Day of June, 1998

Attest:

BRUCE LEHMAN

Attesting Officer      Commissioner of Patents and Trademarks